United States Patent
Saadat Dehghan et al.

(10) Patent No.: US 11,717,966 B2
(45) Date of Patent: Aug. 8, 2023

(54) METHOD AND COMPUTING SYSTEM FOR DETERMINING A VALUE OF AN ERROR PARAMETER INDICATIVE OF QUALITY OF ROBOT CALIBRATION

(71) Applicant: MUJIN, INC., Tokyo (JP)

(72) Inventors: Atilla Saadat Dehghan, Tokyo (JP); Kei Usui, Tokyo (JP)

(73) Assignee: MUJIN, INC., Tokyo (JP)

( * ) Notice: Subject to any disclaimer, the term of this patent is extended or adjusted under 35 U.S.C. 154(b) by 168 days.

(21) Appl. No.: 17/244,224

(22) Filed: Apr. 29, 2021

(65) Prior Publication Data
US 2021/0347054 A1    Nov. 11, 2021

Related U.S. Application Data

(60) Provisional application No. 63/021,089, filed on May 7, 2020.

(51) Int. Cl.
*B25J 9/16*    (2006.01)
*B25J 9/06*    (2006.01)
(Continued)

(52) U.S. Cl.
CPC .............. *B25J 9/1664* (2013.01); *B25J 9/06* (2013.01); *B25J 9/12* (2013.01); *B25J 9/1633* (2013.01);
(Continued)

(58) Field of Classification Search
CPC ..... B25J 9/1664; B25J 9/06; B25J 9/12; B25J 9/1633; B25J 9/1692; B25J 9/1641;
(Continued)

(56) References Cited

U.S. PATENT DOCUMENTS 9,505,132 B1 *    11/2016    Bingham ............... B25J 9/1694
2010/0087955 A1    4/2010    Tsusaka et al.
(Continued)

FOREIGN PATENT DOCUMENTS

CN    107092582 A    8/2017
CN    108621159 A    10/2018
(Continued)

OTHER PUBLICATIONS

M. K. C. D. Chinthaka, R. U. G. Punchihewa, A. M. Harsha and S. Abeykoon, "Disturbance Observer based friction compensator for a DC motor," 2014 11th ECTI-CON, Nakhon Ratchasima, Thailand, 2014, pp. 1-6, doi: 10.1109/ECTICon.2014.6839747. (Year: 2014).*

(Continued)

*Primary Examiner* — Abby Y Lin
*Assistant Examiner* — Dylan Brandon Mooney
(74) *Attorney, Agent, or Firm* — Medler Ferro Woodhouse & Mills PLLC

(57) ABSTRACT

A computing system and method are presented. The computing system may store sensor data which includes: (i) a set of movement data, and (ii) a set of actuation data. The computing system may divide the sensor data into training data and test data by: (i) selecting, as the training data, movement training data and corresponding actuation training data, and (ii) selecting, as the test data, movement test data and corresponding actuation test data. The computing system may determine, based on the movement training data and the actuation training data, at least one of: (i) a friction parameter estimate or (ii) a center of mass (CoM) estimate, and may determine actuation prediction data based on the movement test data and based on the at least one of the friction parameter estimate or the CoM estimate. The computing system may further determine residual data, and determine a value for an error parameter.

20 Claims, 30 Drawing Sheets

(51) Int. Cl.
  *B25J 13/08* (2006.01)
  *B25J 9/12* (2006.01)
(52) U.S. Cl.
  CPC .......... *B25J 9/1692* (2013.01); *B25J 13/085* (2013.01); *B25J 9/1641* (2013.01); *G05B 2219/37373* (2013.01); *G05B 2219/39181* (2013.01)
(58) Field of Classification Search
  CPC ...... B25J 9/1653; B25J 9/1638; B25J 13/085; G05B 2219/37373; G05B 2219/39181; G05B 2219/34013; G05B 19/4142
  See application file for complete search history.

(56) References Cited

U.S. PATENT DOCUMENTS

| | | |
|---|---|---|
| 2015/0199458 A1 | 7/2015 | Bacon et al. |
| 2017/0074753 A1 | 3/2017 | Tian |
| 2017/0290601 A1 | 10/2017 | Hongo et al. |
| 2019/0314986 A1* | 10/2019 | Ohashi .................. B25J 9/1638 |
| 2020/0198133 A1* | 6/2020 | Graichen ................. G01L 3/14 |

FOREIGN PATENT DOCUMENTS

| | | |
|---|---|---|
| CN | 109732605 A | 5/2019 |
| CN | 110298455 A | 10/2019 |

OTHER PUBLICATIONS

Notice of Allowance issued in corresponding Chinese Patent Application No. 202111147979.1 dated Jul. 20, 2022.
International Search Report (ISA/210) and Written Opinion of the International Search Authority (ISA/237) for International Patent Application No. PCT/JP2021/017446 issued/mailed by the Japan Patent Office dated Aug. 3, 2021.
Office Action in corresponding Chinese Patent Application No. 202111147979.1 dated Feb. 21, 2022.

* cited by examiner

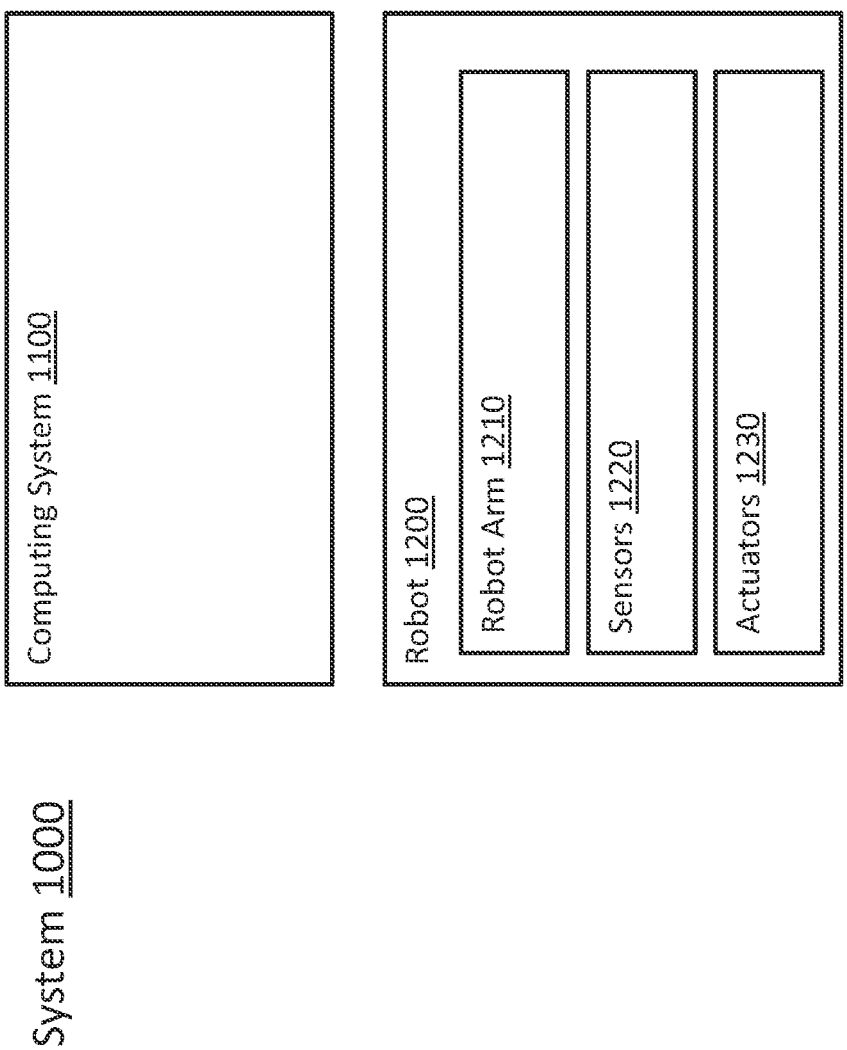

| | Movement data | Actuation data |
|---|---|---|
| $t_1$: | $\theta(t_1)$ | $\tau(t_1)$ |
| $t_2$: | $\theta(t_2)$ | $\tau(t_2)$ |
| $t_3$: | $\theta(t_3)$ | $\tau(t_3)$ |
| $t_4$: | $\theta(t_4)$ | $\tau(t_4)$ |
| $t_5$: | $\theta(t_5)$ | $\tau(t_5)$ |
| $t_6$: | $\theta(t_6)$ | $\tau(t_6)$ |
| $t_7$: | $\theta(t_7)$ | $\tau(t_7)$ |
| $t_8$: | $\theta(t_8)$ | $\tau(t_8)$ |
| $t_9$: | $\theta(t_9)$ | $\tau(t_9)$ |
| $t_{10}$: | $\theta(t_{10})$ | $\tau(t_{10})$ |
| $t_{11}$: | $\theta(t_{11})$ | $\tau(t_{11})$ |
| $t_{12}$: | $\theta(t_{12})$ | $\tau(t_{12})$ |
| $t_{13}$: | $\theta(t_{13})$ | $\tau(t_{13})$ |
| $t_{14}$: | $\theta(t_{14})$ | $\tau(t_{14})$ |
| $\vdots$ | | |
| $t_z$: | $\theta(t_z)$ | $\tau(t_z)$ |

FIG. 7A

| | Movement data | Actuation data |
|---|---|---|
| $t_1$: | $\theta(t_1)$ | $c(t_1)$ |
| $t_2$: | $\theta(t_2)$ | $c(t_2)$ |
| $t_3$: | $\theta(t_3)$ | $c(t_3)$ |
| $t_4$: | $\theta(t_4)$ | $c(t_4)$ |
| $t_5$: | $\theta(t_5)$ | $c(t_5)$ |
| $t_6$: | $\theta(t_6)$ | $c(t_6)$ |
| $t_7$: | $\theta(t_7)$ | $c(t_7)$ |
| $t_8$: | $\theta(t_8)$ | $c(t_8)$ |
| $t_9$: | $\theta(t_9)$ | $c(t_9)$ |
| $t_{10}$: | $\theta(t_{10})$ | $c(t_{10})$ |
| $t_{11}$: | $\theta(t_{11})$ | $c(t_{11})$ |
| $t_{12}$: | $\theta(t_{12})$ | $c(t_{12})$ |
| $t_{13}$: | $\theta(t_{13})$ | $c(t_{13})$ |
| $t_{14}$: | $\theta(t_{14})$ | $c(t_{14})$ |
| $\vdots$ | | |
| $t_z$: | $\theta(t_z)$ | $c(t_z)$ |

FIG. 7B

| | Movement data | | Actuation data |
|---|---|---|---|
| $t_1$: | $\theta(t_1)$ | $\dot{\theta}(t_1)$ | $\tau(t_1)$ |
| $t_2$: | $\theta(t_2)$ | $\dot{\theta}(t_2)$ | $\tau(t_2)$ |
| $t_3$: | $\theta(t_3)$ | $\dot{\theta}(t_3)$ | $\tau(t_3)$ |
| $t_4$: | $\theta(t_4)$ | $\dot{\theta}(t_4)$ | $\tau(t_4)$ |
| $t_5$: | $\theta(t_5)$ | $\dot{\theta}(t_5)$ | $\tau(t_5)$ |
| $t_6$: | $\theta(t_6)$ | $\dot{\theta}(t_6)$ | $\tau(t_6)$ |
| $t_7$: | $\theta(t_7)$ | $\dot{\theta}(t_7)$ | $\tau(t_7)$ |
| $t_8$: | $\theta(t_8)$ | $\dot{\theta}(t_8)$ | $\tau(t_8)$ |
| $t_9$: | $\theta(t_9)$ | $\dot{\theta}(t_9)$ | $\tau(t_9)$ |
| $t_{10}$: | $\theta(t_{10})$ | $\dot{\theta}(t_{10})$ | $\tau(t_{10})$ |
| $t_{11}$: | $\theta(t_{11})$ | $\dot{\theta}(t_{11})$ | $\tau(t_{11})$ |
| $t_{12}$: | $\theta(t_{12})$ | $\dot{\theta}(t_{12})$ | $\tau(t_{12})$ |
| $t_{13}$: | $\theta(t_{13})$ | $\dot{\theta}(t_{13})$ | $\tau(t_{13})$ |
| $t_{14}$: | $\theta(t_{14})$ | $\dot{\theta}(t_{14})$ | $\tau(t_{14})$ |
| $\vdots$ | | | |
| $t_z$: | $\theta(t_z)$ | $\dot{\theta}(t_z)$ | $\tau(t_z)$ |

FIG. 7C

| time: | $t_a$ | $t_{a+1}$ | $t_{a+2}$ | ... | $t_z$ |
|---|---|---|---|---|---|
| $\theta_{test}$: | $\theta_{test\_1}$ | $\theta_{test\_2}$ | $\theta_{test\_3}$ | ... | $\theta_{test\_n}$ |
| $\tau_{test}$: | $\tau_{test\_1}$ | $\tau_{test\_2}$ | $\tau_{test\_3}$ | ... | $\tau_{test\_n}$ |
| $\tau_{prediction}$: | $\tau_{predict\_1}$ | $\tau_{predict\_2}$ | $\tau_{predict\_3}$ | ... | $\tau_{predict\_n}$ |
| Residual: | $e_1$ | $e_2$ | $e_3$ | ... | $e_n$ |

METHOD AND COMPUTING SYSTEM FOR DETERMINING A VALUE OF AN ERROR PARAMETER INDICATIVE OF QUALITY OF ROBOT CALIBRATION

CROSS-REFERENCE TO RELATED APPLICATION(S)

The present application claims the benefit of U.S. Provisional Application No. 63/021,089, entitled "A ROBOTIC SYSTEM WITH ROBOT OPERATION PARAMETER DETERMINATION," and filed May 7, 2020, the entire content of which is incorporated by reference herein.

FIELD OF THE INVENTION

The present disclosure is related to a method and computing system for determining a value of an error parameter indicative of a quality of a result of robot calibration.

BACKGROUND OF THE INVENTION

As automation becomes more common, robots are being used in more environments, such as in warehousing and retail environments. For instance, robots may be used to interact with objects in a warehouse. The movement of the robot may be fixed, or may be based on an input, such as information generated by a sensor in the warehouse.

However, despite technological advancements, robots often lack the sophistication necessary to duplicate human interactions required for executing larger and/or more complex tasks. In order for a robot to approximate human action, the robot should be calibrated in order to control movement of the robot with accuracy and precision.

SUMMARY

One aspect of the present disclosure relates to a computing system, a method performed by the computing system, or a non-transitory computer-readable medium having instructions for performing the method. In this embodiment, the computing system includes the non-transitory computer-readable medium and at least one processing circuit. The at least one processing circuit is configured to perform various operations when the non-transitory computer-readable medium is storing sensor data which includes: (i) a set of movement data indicative of an amount or rate of relative movement between a pair of immediately adjacent arm segments of a robot arm that is occurring or has occurred via a joint of the robot arm, and (ii) a set of actuation data indicative of overall torque or overall force at the joint in a time period during which the relative movement is occurring or has occurred. The various operations may include the following: dividing the sensor data into training data and test data by: (i) selecting, as the training data, movement training data and corresponding actuation training data, wherein the movement training data is a first subset of the set of movement data, and wherein the actuation training data is a first subset of the set of actuation data, and (ii) selecting, as the test data, movement test data and corresponding actuation test data, wherein the movement test data is a second subset of the set of movement data, and wherein the actuation test data is a second subset of the set of actuation data. The various operations may further include determining, based on the movement training data and the actuation training data, at least one of: (i) a friction parameter estimate associated with friction between the pair of immediately adjacent arm segments, or (ii) a center of mass (CoM) estimate associated with one of the pair of immediately adjacent arm segments. The various operations may further include determining actuation prediction data based on the movement test data and based on the at least one of: (i) the friction parameter estimate or (ii) the CoM estimate, wherein the actuation prediction data is a prediction which is indicative of overall torque or overall force at the joint at different points in time. The various operations may further include determining residual data, which includes residual data values describing deviation between the actuation prediction data and the actuation test data corresponding to the different points in time, respectively; determining, based on the residual data, a value for an error parameter which describes the residual data values; determining whether the value of the error parameter exceeds a defined error threshold; and outputting an indication of whether the value of the error parameter exceeds the defined error threshold.

BRIEF DESCRIPTION OF THE FIGURES

FIGS. 1A-1C illustrate a system for assessing a quality or reliability of a result of robot calibration or of sensor data used to perform the robot calibration, consistent with embodiments hereof.

FIGS. 7A-7C illustrate actuation data and movement data, consistent with embodiments hereof.

FIG. 13A illustrates an example of residual data values, consistent with an embodiment hereof.

DETAILED DESCRIPTION OF THE FIGURES

Figure 1A:
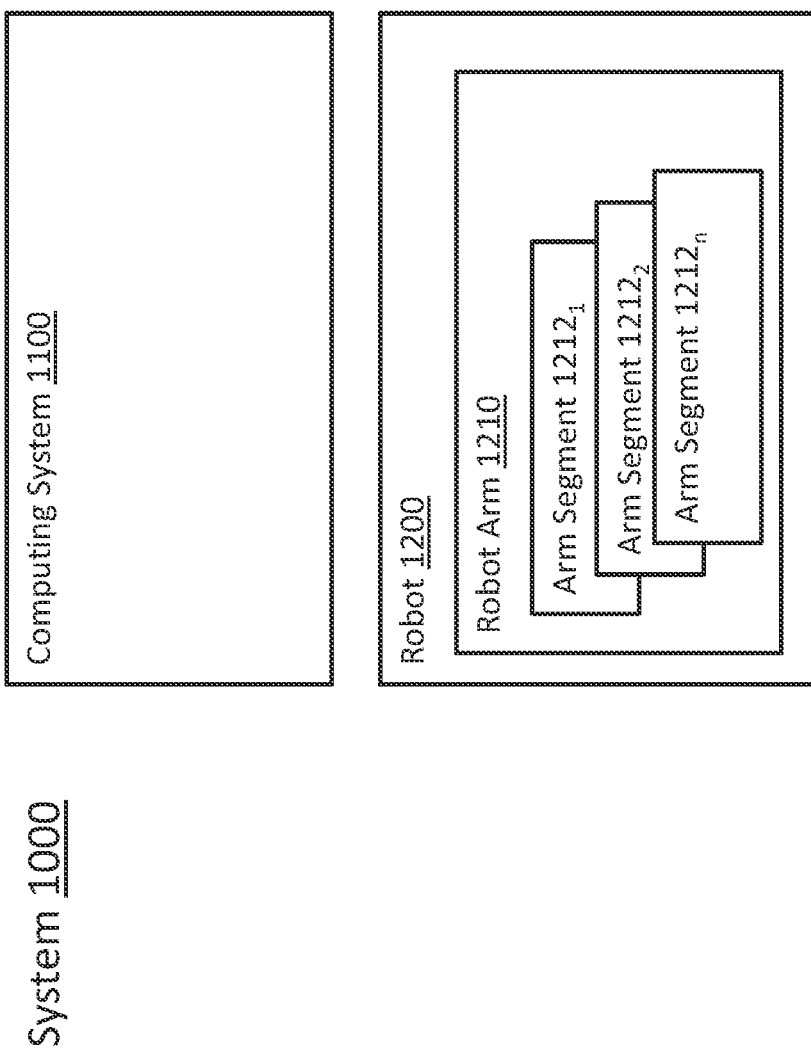

One aspect of the present disclosure relates to estimating a property of a robot, which may be performed as part of a robot calibration operation. In some scenarios, the robot may be located in, e.g., a warehouse or factory, and may be used to pick up or otherwise interact with objects in that environment. The robot calibration operation may involve estimating one or more parameters which describe a physical property of the robot, such as friction between components of the robot, or a location of a center of mass (CoM) of a component of the robot. In some scenarios, the values of these physical properties may deviate from nominal or theoretical values provided by a manufacturer of the robot. The deviation may arise from a variety of factors, such as manufacturing tolerance, aging, temperature change, or some other factor.

A more specific aspect of the present disclosure relates to assessing an accuracy, reliability, or quality of estimated values of the one or more parameters, of a model used to determine the estimated values, and/or of sensor data used to determine the estimated values. In an embodiment, such an assessment may involve dividing the sensor data into training data and test data. For instance, the sensor data may, e.g., measure movement of a component of the robot, or of force or torque experienced by that component, and may include actuation data and movement data. In this example, the sensor data may be divided into actuation training data (also referred to as training actuation data), movement training data (also referred to as training movement data), actuation test data (also referred to as test actuation data), and movement test data (also referred to as test movement data). In other words, the actuation data and the movement data may each be divided into training data and test data. In this example, the actuation training data may be training data that is extracted from the actuation data, and may be, e.g., a first portion of the actuation data, while the actuation test data may be test data that is also extracted from the actuation data, and may be, e.g., a second portion of the actuation data. Thus, the actuation training data and the actuation test data may also be referred to as the actuation-related training data and the actuation-related test data, respectively. Similarly, the movement training data may be training data that is extracted from the movement data, and may be, e.g., a first portion of the movement data, while the movement test data may be test data that is also extracted from the movement data, and may be, e.g., a second portion of the movement data. Thus, the movement training data and the movement test data in this example may also be referred to as movement-related training data and movement-related test data, respectively. In some instances, the movement data may be divided into the movement training data and the movement test data based on a ratio between velocity values indicated by the movement data and position values indicated by the movement data. For example, the movement data may be divided into training data and test data by comparing the ratio to a defined ratio threshold, which may represent a slope of a line that is dividing a coordinate system representing the movement data into symmetric regions. In such instances, the actuation data may be divided into training data and actuation data so as to correspond to the movement training data and the movement test data.

In some implementations, the actuation training data and movement training data may be used to determine estimated values or perform some other aspect of robot calibration. When the estimated values are determined, they may be used, along with the movement test data, to determine prediction data, or more specifically actuation prediction data. As discussed below in more detail, the actuation prediction data may be data that provides a prediction which indicates overall torque or overall force at an arm segment or joint. Thus, the actuation prediction data may also be referred to as actuation-related prediction data. In some instances, the actuation prediction data may be compared against actuation test data to determine residual data values that indicate a level of deviation between the actuation prediction data and actuation test data. The residual data values may be used to assess the accuracy or reliability of a result of the robot calibration, or quality of the sensor data used to perform the robot calibration.

In an embodiment, the accuracy, reliability, or quality discussed above may be assessed via a value of an error parameter, which may be determined based on the residual data values. In some instances, the error parameter may be indicative of frequency content of the residual data values. For instance, the error parameter may be determined by applying a sliding time window to the residual data values, and calculating a respective average value for a group of residual data values in a particular time window. In this embodiment, the sliding time window may more specifically define multiple overlapping time windows corresponding to respective groups of residual data values. The multiple overlapping time windows may further correspond to multiple average values for the respective groups of residual data values. In some implementations, the value of the error parameter may be a maximum of the multiple average values. In some instances, the value of the error parameter may indicate whether the residual data values have low frequency content or high frequency content. The presence of low frequency content may indicate or may be consistent with a robot experiencing an event, such as a collision with another object, which may cause uneven movement of the robot and degrade a quality of the sensor data used for the robot calibration, wherein the sensor data may measure the movement of the robot.

Figure 1C:
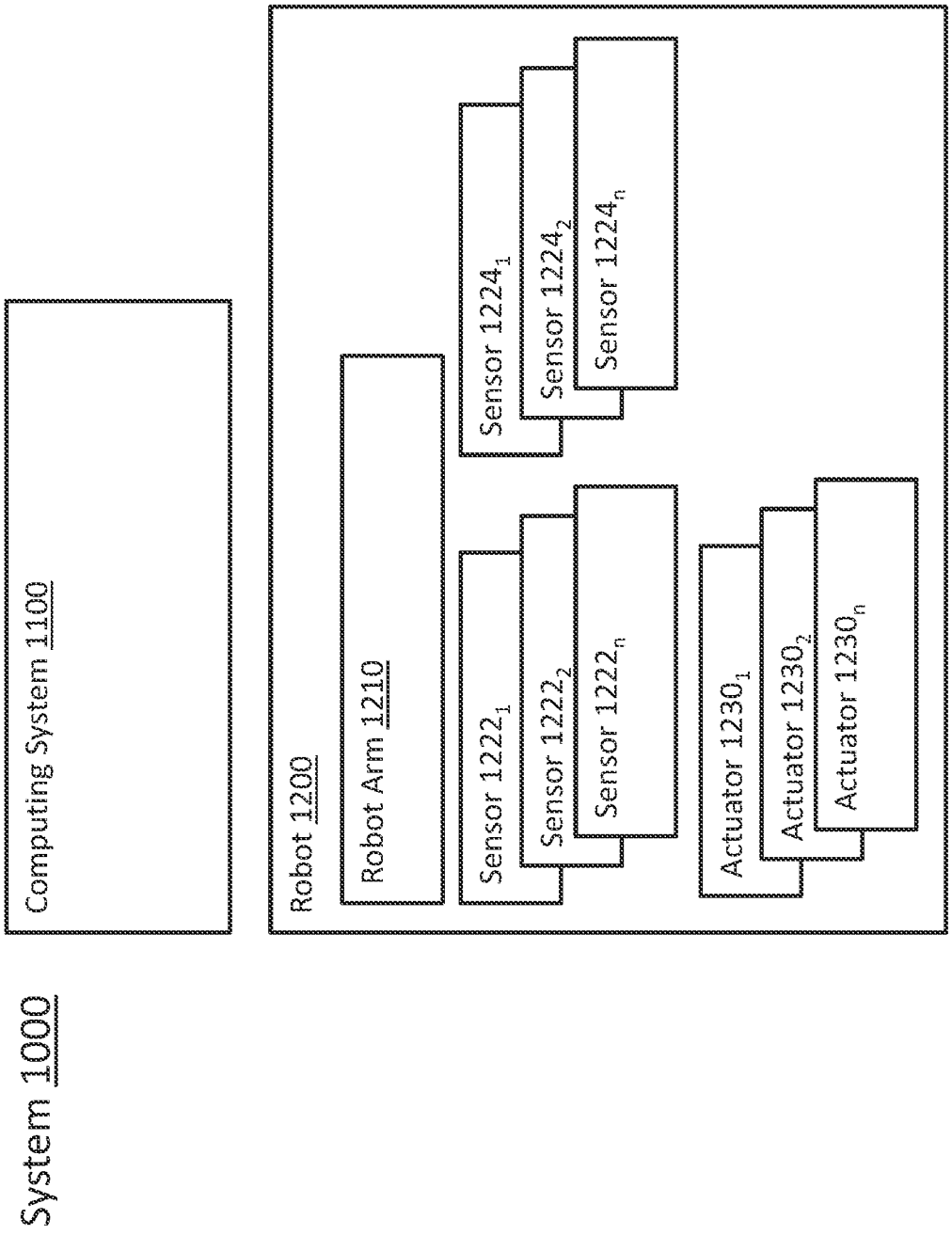

FIGS. 1A, 1B, and 1C illustrate a system 1000 for determining information which estimates or otherwise describes a physical property or physical properties of a robot, or more specifically for performing robot calibration. One skilled in the art will realize that FIGS. 1A-1C illustrate one example of a system 1000 that is used to perform robot calibration, and that components illustrated in FIGS. 1A-IC may be removed or omitted, and/or additional components may be added to the system 1000. As illustrated in FIG. 1A, the system 1000 may include a computing system 1100 and a robot 1200. In an embodiment, the system 1000 may be a robot calibration system or a component thereof, wherein the robot calibration system is configured to perform robot calibration, which may involve, e.g., determining one or more physical properties or some other property of the robot 1200. The robot calibration may be performed, e.g., so as to enhance a level of accuracy by which robot movement (also referred to as robot motion) of the robot 1200 may be controlled, or more specifically to enhance an ability to plan and/or accurately execute a trajectory for the robot 1200. The computing system 1100 in embodiments herein may be configured to determine an accuracy or reliability of the robot calibration. More particularly, the computing system 1100 may be configured to determine a value of an error parameter. The error parameter may indicate an accuracy of an estimate, a model, or other information obtained from the robot calibration (e.g., an estimate of a physical property of the robot 1200), and/or indicate a quality of sensor data used to perform the robot calibration.

In some instances, the computing system 1100 may determine the one or more physical properties of the robot 1200, and/or may use the one or more physical properties of the robot 1200 to generate movement commands for causing the robot 1200 to output movement (also referred to as motion) according to a planned trajectory. For example, the computing system 1100 may be configured to determine movement commands (e.g., motor commands) which are specific to or otherwise take into account the one or more physical properties of the robot 1200. As an example, the one or more physical properties may include, e.g., friction between components of the robot 1200 (e.g., arm segments of a robot arm), respective locations at which those components have their center of mass (CoM), respective values for mass or moment of inertia of those components, and/or some other physical property. These properties of the robot may constrain or otherwise affect motion of the robot 1200, and/or affect how components of the robot 1200 should be actuated.

In some instances, the properties that are estimated by system 1000 may be utilized to describe physics (e.g., kinematics) of the motion of the robot 1200, such as by describing how one or more components of the robot 1200 responds to a force, torque, or other form of actuation. If the computing system 1100 of FIG. 1A or another computing system is used to control movement of the robot 1200, the movement may be controlled based on the properties that are estimated. For instance, a motor or other actuator may output a force or torque to initiate or adjust motion of a component of the robot 1200 (e.g., linear motion or rotational motion), but the motion may be affected by factors such as a force due to friction (which may resist the motion or a change in the motion), a force due to gravity, and/or an inertial element such as mass or moment of inertia of the component (which may also resist the motion or a change in the motion). In this example, controlling motion for the component of the robot may involve compensating for the above factors, or more generally taking them into account, when determining, e.g., magnitude values, direction, and/or duration of a force or torque to be output by an actuator used to drive the component of the robot. The motion control may be used to, e.g., execute a trajectory by the robot 1200, which in some scenarios may involve precisely following planned values for position, velocity or speed, and/or acceleration for various components of the robot. That is, the motion control may involve following a planned trajectory, which may involve a specific value or set of values for velocity and/or acceleration of various components of the robot. The estimates of the physical properties discussed above may be used to control the actuators so as to cause the executed trajectory to closely match the planned trajectory.

In an embodiment, performing the robot calibration may involve determining or updating a force model and/or torque model. In such an embodiment, the computing system 1100 (or some other computing system) may determine how much force and/or torque to be applied by an actuator(s), or a direction or duration of the force and/or torque, based on the force model and/or torque model. In some instances, the force model and/or torque model may be formed by or may include information that describes factors which influence an overall force or overall torque on the robot 1200 or a component thereof. For example, the force model and/or torque model may include values for parameters that represent, e.g., friction, gravity, mass, moment of inertia, and/or a combination thereof. In some scenarios, the force model and/or torque model may include a friction model, which may include information that describes how much friction will be experienced by the robot or a component thereof. As an example, the friction model may include parameters which represent viscous friction (also referred to as dynamic friction or sliding friction) and coulomb friction (also referred to as static friction), which are discussed below in more detail. In some situations, the force model and/or torque model may describe a relationship (e.g., mathematical relationship) between a force and/or torque output by an actuator(s) and an overall torque or overall force experienced by the component of the robot, and/or may describe a relationship between the force and/or torque output by the actuator(s) and resulting motion of the component of the robot. In the above example, if the robot calibration results in a force model or torque model, the computing system 1100 (or some other computing system) may utilize the force model and/or torque model to control the actuator(s), or more generally to control motion of the robot 1200. In this embodiment, the error parameter discussed above may describe an accuracy or reliability of the force model and/or torque model, and/or describe a quality of sensor data used to generate the force model and/or torque model. Thus, the computing system 1100 may be configured to determine a value of the error parameter so as to determine an accuracy or reliability of the force model and/or torque model obtained from performing robot calibration.

As stated above, the system 1000 of FIG. 1A may be used to perform robot calibration, such as by determining information which describes or otherwise represents a physical property or properties of the robot 1200. In some instances, the system 1000 (and associated methods performed by the system 1000) operates to perform robot calibration by causing movement of the robot 1200, and using data which describes the movement to determine the physical properties of the robot. More particularly, during the movement, the computing system 1100 may monitor the robot 1200 and receive sensor data which describes the movement of a component of the robot 1200. Based on the received sensor data, the computing system 1100 may determine a respective estimated value for each of the physical properties of the robot 1200 or a component thereof. In this embodiment, the error parameter which may be determined by the computing system 1100 may indicate an accuracy or reliability for the estimated value of each of the physical properties of the robot 1200.

In an embodiment, the robot 1200 may include a robot arm 1210, and performing robot calibration may involve determining a physical property or physical properties for components (e.g., arm segments) of the robot arm 1210. More particularly, the robot arm 1210 may include a number, n, of arm segments $1212_1$, $1212_2$, ... $1212_n$ (also referred to as links of the robot arm 1210), and the physical property or properties determined from robot calibration may describe one or more of the arm segments $1212_1$-$1212_n$. In some instances, each of the arm segments $1212_1$-$1212_n$ may be independently actuatable or moveable in multiple planes of motion. In some implementations, the arm segments $1212_1$-$1212_n$ may be coupled to each other in series (e.g., via a plurality of joints), such that the robot arm 1210 is formed from a series of the arm segments $1212_1$-$1212_n$. In this embodiment, the arm segments $1212_1$-$1212_n$ may form a kinematic chain for moving an end effector (also referred to as an end effector apparatus) or other arm segment to a particular pose. For instance, the arm segments $1212_1$-$1212_n$ may be coupled such that each of the arm segments $1212_1$-$1212_n$ has a first end (e.g., proximal end) which is coupled to a robot base or to a preceding arm segment in the series of arm segments $1212_1$-$1212_n$, and has a second end (e.g., distal end) that is coupled to a following arm segment in the series of arm segments $1212_1$-$1212_n$ or forms a distal end of the robot arm 1210. In this manner, the arm segment $1212_1$ may be followed by the arm segment $1212_2$, which may be followed by the arm segment $1212_3$, which may be followed by the arm segment $1212_4$, etc. As an example, the arm segment $1212_1$ may be coupled to the robot base at a proximal end of the arm segment $1212_1$ and may be coupled to arm segment $1212_2$ at a distal end of the arm segment $1212_1$. Further in this example, the arm segment $1212_2$ may be coupled to the arm segment $1212_1$ at a proximal end of the arm segment $1212_2$, and may be coupled to the arm segment $1212_3$ at a distal end of the arm segment $1212_2$. In some implementations, the arm segment $1212_n$ may be the end effector apparatus. One skilled in the art will realize that the arms segments $1212_1$-$1212_n$ may be coupled in any arrangement in order to perform movements according to operational requirements of the robot 1200.

In an embodiment, if the robot calibration involves determining information regarding a physical property of the arm segments $1212_1$-$1212_n$ of the robot arm 1210, the information may be used to control movement of the robot arm 1210. For instance, the arm segments $1212_1$-$1212_n$ may be movable relative to one another to produce an overall motion of the robot arm 1210 to achieve a desired pose for an end effector or other arm segment at a distal end of the robot arm 1210. If the computing system 1100 is involved in controlling movement of the robot arm 1210, such as by planning a trajectory for the robot arm 1210, the computing system 1100 may plan movement of individual arm segments. This planning of movement for the individual arm segments may be based on the determined information regarding a physical property of the individual arm segments. In some instances, the robot calibration may involve determining a force model and/or torque model that describes factors which affect how much overall force or overall torque is exerted on the individual arm segments. For example, the force model and/or torque model may apply to an arm segment or a joint connecting a pair of arm segments, and may describe a relationship between an overall force or overall torque experienced by the arm segment or the joint and an amount or rate of movement by the arm segment relative to the joint. In such instances, the computing system 1100 may plan movement of the individual arm segments based on the force model and/or torque model. In this embodiment, if the computing system 1100 generates or otherwise determines a force model and/or torque model that is specific to an individual arm segment or joint, the computing system 1100 may further be configured to determine an error parameter value that is specific to that individual arm segment or joint, wherein the error parameter value refers to a value of the error parameter discussed above, and may indicate a reliability or accuracy of the force model or torque model. If the computing system 1100 generates a respective force model and/or torque model for each of the arm segments or joints, the computing system 1100 may further determine a respective error parameter value for each of the arm segments or joints.

In an embodiment, if performing the robot calibration involves determining information regarding a physical property for each arm segment of the arm segments $1212_1$-$1212_n$ of the robot arm 1210, the physical property may involve a parameter which describes a relationship between movement of the arm segment and torque or force directly applied to the arm segment. For example, the parameter may describe, for each of the arm segments $1212_1$-$1212_n$, a location of a center of mass of the arm segment, mass or weight of the arm segment, how mass of the arm segment is distributed, a moment of inertia of the arm segment, and/or friction between the arm segment and another component (e.g., another arm segment) of the robot arm 1210. The parameter may be used by the computing system 1100 or any other computing system when planning a trajectory for the robot arm 1210. For instance, the computing system 1100 may use the parameter to predict how much movement or a rate of movement will be produced by a particular amount of force or torque, or to determine how much force or torque is needed to generate a certain amount of movement or rate of movement. More particularly, the computing system 1100 may use the parameter to determine an amount of force or torque which compensates for an effect of friction on an arm segment, an effect of gravity on the arm segment (which may be approximated as acting on the CoM of the arm segment), and/or mass or moment of inertia of the arm segment. In this embodiment, if the robot calibration involves determining an estimated value for, e.g., the location of a center of mass of a particular arm segment or for a coefficient of friction between two arm segments, the error parameter discussed above may describe or otherwise indicate an accuracy and/or reliability of the estimated value.

In an embodiment, as illustrated in FIG. 1B, the robot 1200 may include a set 1220 of one or more sensors and a set 1230 of one or more actuators (e.g., motors), which may be used to perform the robot calibration operation. The set 1230 of one or more actuators may each be configured to output a force or a torque, which may be applied to one or more of the arm segments $1212_1$-$1212_n$ of the robot arm 1210 so as to cause movement of the one or more arm segments. In an embodiment, the operation of the set 1230 of one or more actuators may be controlled by the computing system 1100. For instance, the computing system 1100 may be configured to output one or more movement commands for causing activation of at least one actuator of the set 1230 of one or more actuators. In some implementations, the one or more movement commands may include an analog and/or digital signal for causing the set 1230 of one or more actuators to activate and output a force and/or torque. The one or more movement commands may in some instances control how much force or torque is output by the activated actuator, a direction of the force or torque, and/or a duration of the force or torque.

In an embodiment, as illustrated in FIG. 1C, the set 1230 of one or more actuators may include a plurality of actuators $1230_1$-$1230_n$, each of which may output a force or torque for causing movement of a respective arm segment of the plurality of arm segments $1212_1$-$1212_n$. For instance, the multiple actuators $1230_1$-$1230_n$ may be configured to output torque for rotating or otherwise moving the arm segments $1212_1$-$1212_n$. In one example, the actuators $1230_1$-$1230_n$ may be coupled to or disposed at the arm segments $1212_1$-$1212_n$, and may output respective forces or torques when activated to cause movement of the arm segments $1212_1$-$1212_n$, respectively. In such an example, activation of the actuators $1230_1$-$1230_n$ and/or respective amounts of force or torque output by the actuators $1230_1$-$1230_n$ may be controlled by the computing system 1100 (e.g., via movement commands).

In an embodiment, the set 1220 of one or more sensors are configured to generate one or more sets of sensor data (also referred to as data sets) that are used by the computing system 1100 to perform robot calibration. In some scenarios, the data sets may measure or otherwise represent the movement of the one or more of the arm segments $1212_1$-$1212_n$ and/or a force or torque experienced by the arm segments $1212_1$-$1212_n$. For example, one or more data sets for the sensor data may include a set of actuation data and a set of movement data.

In an embodiment, the set of actuation data may include data that represents overall force and/or overall torque experienced by one or more of the arm segments $1212_1$-$1212_n$ or experienced at one or more joints. The overall force or overall torque on an arm segment may include or be based on forces or torques due to a contribution by the actuators $1230_1$-$1230_n$, forces or torques due to a contribution from gravity, and forces or torques due to a contribution from friction. The set of actuation data ay directly indicate or be directly proportional to the overall force or overall torque experienced by the one or more of the arm segments or at one or more joints.

In an embodiment, the set of movement data for one of the arm segments $1212_1$-$1212_n$ may include data that represents an amount of movement or rate of movement (e.g., velocity or acceleration) of the arm segment. The movement may be, e.g., rotation of an arm segment, linear movement of the arm segment, or some other movement. In some instances, the amount of movement or rate of movement may be measured relative to another component of the robot 1200, such as another arm segment. For instance, a position of this other arm segment may be treated as a baseline position (or, more generally, a reference frame) from which the amount of movement or rate of movement of the moving arm segment is measured. In some instances, the amount of movement may be represented by a position or displacement of the moving arm segment, which may be relative to, e.g., the baseline position discussed above. If the movement involves rotation of one arm segment relative to the baseline position, the position or displacement may also be referred to as a rotational position, rotational displacement, or angular displacement, and may be measured in degrees or radians. In some instances, a positive value for the rotational position may indicate that the moving arm segment has rotated in one direction (e.g., counterclockwise direction) past the baseline position, while a negative value for the rotational position may indicate that the moving arm segment has rotated in an opposite direction (e.g., clockwise direction) past the baseline position.

In an embodiment, the set 1220 of one or more sensors may include a first set of sensors $1222_1$, $1222_2$, ... $1222_n$ for generating the actuation data and a second set of sensors $1224_1$, $1224_2$, ... $1224_n$ for generating the movement data, as illustrated in FIG. 1C. In some implementations, the first set of sensors $1222_1$-$1222_n$ may be disposed at or otherwise corresponds with the arm segments $1212_1$-$1212_n$. Similarly, the second set of sensors $1224_1$-$1224_n$ may also be disposed at or otherwise corresponds with the arm segments $1212_1$-$1212_n$. In this example, each of the first set of sensors $1222_1$-$1222_n$ may generate a respective set of actuation data which is indicative of force or torque at a respective arm segment of the plurality of arm segments $1212_1$-$1212_n$. Further, each of the second set of sensors $1224_1$-$1224_n$ may generative a respective set of movement data which is indicative of an amount or rate of movement of a respective arm segment of the plurality of arm segments $1212_1$-$1212_n$. In some implementations, the arm segments $1212_1$-$1212_n$ are driven or otherwise actuated by the actuators $1230_1$-$1230_n$, and each sensor of the first set of sensors $1222_1$-$1222_n$ may be a torque sensor or an electrical current sensor that corresponds to a respective actuator of the plurality of actuators $1230_1$-$1230_n$. If the each of the sensors $1222_1$-$1222_n$ is an electrical current sensor, the sensor may be configured to measure a respective amount of electrical current flowing through the sensor, which may be substantially equal to a respective amount of electrical current flowing through a respective actuator of the plurality of actuators $1230_1$-$1230_n$. The amount of electrical current flowing through the actuator may be used to calculate or otherwise determine an amount of overall force or overall torque experienced by a corresponding arm segment. This calculation may be performed by the computing system 1100, or by the sensors $1222_1$-$1222_n$ themselves.

Figure 2A:
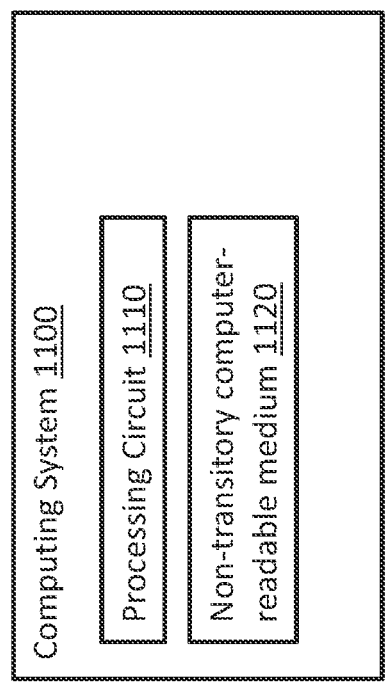
FIGS. 2A-2D provide block diagrams that illustrate a computing system for assessing a quality or reliability of a result of robot calibration or of sensor data used to perform the robot calibration, consistent with embodiments hereof.

FIG. 2A provides a block diagram that illustrates an embodiment of the computing system 1100. The computing system 1100 includes at least one processing circuit 1110 and a non-transitory computer-readable medium (or media) 120. In an embodiment, the processing circuit 1110 includes one or more processors, one or more processing cores, a programmable logic controller ("PLC"), an application specific integrated circuit ("ASIC"), a programmable gate array ("PGA"), a field programmable gate array ("FPGA"), any combination thereof, or any other processing circuit. In an embodiment, the non-transitory computer-readable medium 1120 may be a storage device, such as an electronic storage device, a magnetic storage device, an optical storage device, an electromagnetic storage device, a semiconductor storage device, or any suitable combination thereof, for example, such as a computer diskette, a hard disk drive (HDD), a solid state drive (SSD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, any combination thereof, or any other storage device. In some instances, the non-transitory computer-readable medium 1120 may include multiple storage devices. The non-transitory computer-readable medium 1120 may alternatively or additionally store computer readable program instructions that, when executed by the processing circuit 1110, causes the processing circuit 1110 to perform one or more methods described herein, such as the operations described with respect to method 4000 illustrated in FIG. 4.

Figure 2B:
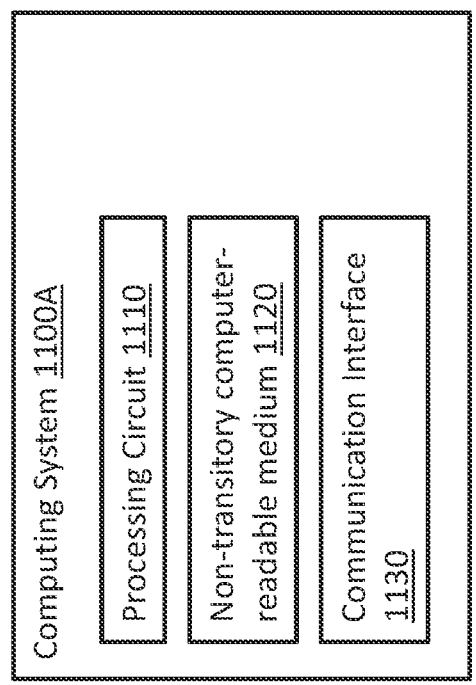

FIG. 2B depicts a computing system 1100A that is an embodiment of the computing system 1100 and that includes a communication interface 1130. The communication interface 1130 may be configured to provide a wired or wireless communication pathway between the computing system 1100A and the robot 1200, such as with the sensors (e.g., 1220) and/or actuators (e.g., 1230) discussed above. As an example, the communication circuit may include a RS-232 port controller, a USB controller, an Ethernet controller, a Bluetooth® controller, a PCI bus controller, a network controller, any other communication circuit, or a combination thereof. If the computing system 1100A generates one or more movement commands, the communication interface 1130 may be configured to communicate the one or more movement commands to the set 1230 of actuators. Further, if the set 1220 of sensors generate sensor data, the communication interface 1130 may be configured to receive the sensor data (e.g., movement data and actuation data) from the set 1220 of sensors. In such a situation, the processing circuit 1110 of the computing system 1100 may be configured to directly or indirectly receive the sensor data via the communication interface 1130.

Figure 2C:
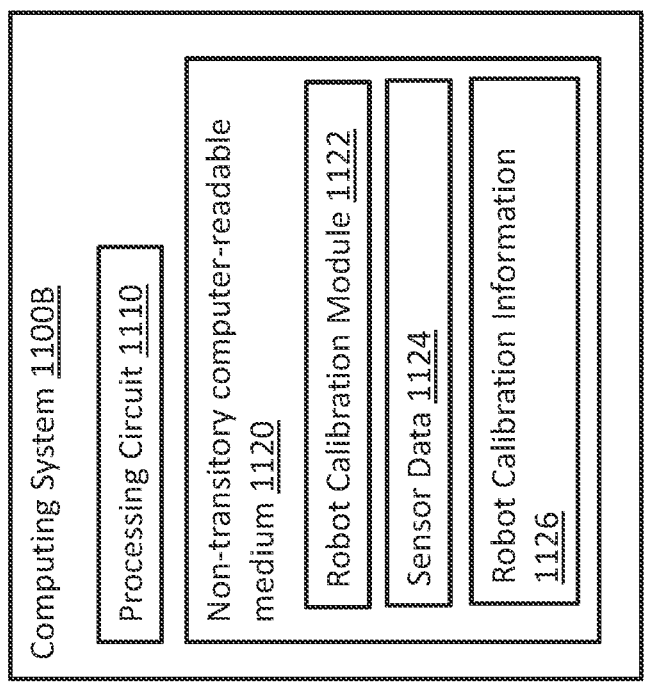

In an embodiment, the processing circuit 1110 may be programmed by one or more computer-readable program instructions stored on the non-transitory computer-readable medium 1120. For example, FIG. 2C illustrates a computing system 1100B, which is an embodiment of the computing system 1100/1100A, in which the processing circuit 1110 is programmed by one or more modules, including a robot calibration module 1122, which may include computer-readable program instructions for performing robot calibration and/or for evaluating an accuracy and/or reliability of a result of the robot calibration. For example, the robot calibration module 1122 may be configured to determine, for a CoM estimate associated with a particular arm segment or a friction parameter estimate associated with a particular joint between arm segments, an error parameter value for the CoM estimate or friction parameter estimate, wherein the error parameter value may be a value of the error parameter discussed above. If the robot calibration module 1122 determines multiple CoM estimates or multiple friction parameter estimates, the module 1122 may determine multiple respective error parameter values for the multiple estimates. In various embodiments, the terms "computer-readable instructions" and "computer-readable program instructions" are used to describe software instructions or computer code configured to carry out various tasks and operations. In various embodiments, the term "module" refers broadly to a collection of software instructions or code configured to cause the processing circuit 1110 to perform one or more functional tasks. The modules and computer-readable instructions may be described as performing various operations or tasks when a processing circuit or other hardware component is executing the modules or computer-readable instructions.

Figure 2D:
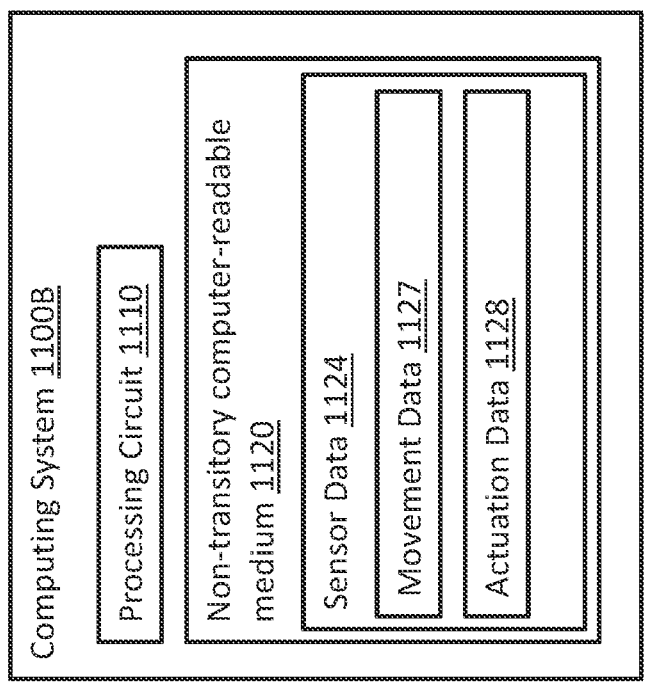

In an embodiment, as illustrated in FIG. 2C, the non-transitory computer-readable medium 1120 may store or otherwise include sensor data 1124, which may be used by the processing circuit 1110 to perform robot calibration. The sensor data 1124 may include, e.g., the actuation data and the movement data described above. For instance, FIG. 2D depicts an example in which the sensor data 1124 includes movement data 1127 and actuation data 1128. In some instances, the movement data 1127 and actuation data 1128 may each include multiple sets of data, wherein each set of data describes movement associated with a respective arm segment or describes overall force or torque at the respective arm segment or at a respective joint connecting the arm segment to another arm segment. In some scenarios, the sensor data 1124 may have been generated by the set 1220 of sensors of FIG. 1B, and may have been received via the communication interface 1130 of FIG. 2B. If the stored sensor data 1124 is used to perform a robot calibration operation, the non-transitory computer-readable medium 1120 may further store information 1126 that is determined as a result of the robot calibration operation (also referred to as robot calibration information 1126). The robot calibration information 1126 may describe a physical property or physical properties of a robot (e.g., 1200). For example, the robot calibration information may include respective estimates (also referred to as estimated values) for various parameters which describe the physical property or physical properties of the robot. In some instances, the robot calibration information may describe a torque model, a force model, and/or a friction model. In an embodiment, the robot calibration information 1126 may include error parameter values which indicate a reliability and/or accuracy of the respective estimates discussed above, and/or a reliability or quality of the sensor data used to generate the respective estimates.

Figure 3A:
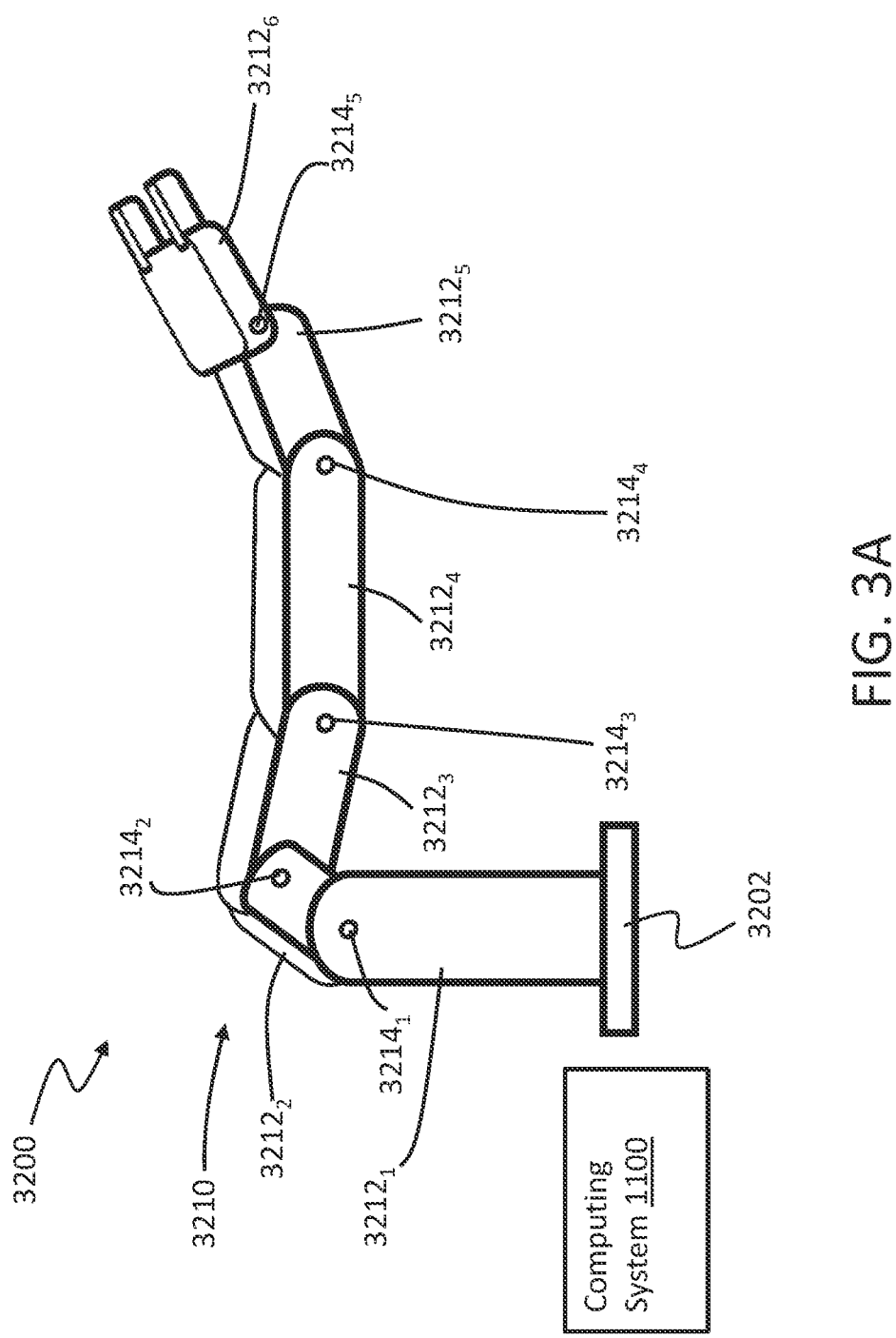
FIGS. 3A-3E illustrate an environment in which robot calibration may be performed, consistent with an embodiment hereof.

FIGS. 3A-3D illustrate an example environment(s) in which robot calibration may be performed according to various embodiments. One skilled in the art will realize that FIGS. 3A-3D illustrate one example of an environment(s) for performing robot calibration, and that existing components illustrated in FIGS. 3A-3D may be removed and/or additional components may be added to the environment. FIG. 3A presents a side view of a robot 3200, which may be an embodiment of the robot 1200. The robot 3200 may include a robot arm 3210 that is coupled to a base 3202. In the example of FIG. 3A, the robot arm 3210 may include a plurality of arm segments $3212_1$, $3212_2$, $3212_3$, $3212_4$, $3212_5$, and $3212_6$ (also referred to as links), which may be coupled at a plurality of joints $3214_1$, $3214_2$, $3214_3$, $3214_4$, $3214_5$. In the example of FIG. 3A, the arm segments $3212_1$-$3212_6$ may be connected as a series of arm segments, which may extend in a downstream direction, which may be a direction away from the base 3202. In this example, the arm segment $3212_6$ which is furthest downstream along the robot arm 3210 may bean end effector apparatus (e.g., a robot gripper), and may form a distal end of the robot arm 3210. That is, the arm segment $3212_6$ may be the most distal arm segment of the robot arm 3210, relative to the robot base 3202.

In an embodiment, the joints $3214_1$-$3214_5$ may directly couple respective pairs of immediately adjacent arm segments. For example, the arm segment $3212_1$ is coupled to the arm segment $3212_2$ at a joint $3214_1$. In this example, the arm segment $3212_1$ and the arm segment $3212_2$ may be considered to be immediately adjacent to each other because they are directly coupled to each other via the joint $3214_1$. The joint $3214_1$ may allow relative movement between the pair of arm segments $3212_1$, $3212_2$. In one example, the joint $3214_1$ may be a revolute joint (or, more generally, a pivot point) that allows relative rotation between the pair of arm segments $3212_1$, $3212_2$, or more particularly allows the arm segment $3212_2$ to rotate relative to the arm segment $3212_1$. In this example, the other joints $3214_2$ through $3214_5$ may each be a revolute joint that directly connects a respective pair of immediately adjacent arm segments, and that permits relative rotation between the pair of arm segments. For instance, the joint $3214_5$ may directly connect arm segment $3212_5$ and arm segment $3212_6$, and permit the arm segment $3212_6$ to rotate relative to the arm segment $3212_5$. In another example, the robot arm 3210 may additionally or alternatively have prismatic joints which permit relative linear motion (also referred to as relative lateral motion) between a pair of immediately adjacent arm segments.

As stated above, the arm segments $3212_1$-$3212_6$ may be connected as a series of arm segments, which may extend in a downstream direction, from the arm segment $3212_1$ to the arm segment $3212_6$. The arm segment $3212_1$ may be closest (also referred to as being most proximal) to the robot base 3202, while the arm segment $3212_6$ may be the furthest (i.e., also referred to as being the most distal) from the robot base 3202. The series of arm segments $3212_1$ through $3212_6$ may form a kinematic chain in which movement of one arm segment (e.g., $3212_3$) causes movement of downstream arm segments (e.g., $3212_4$, $3212_5$, $3212_6$). The series connection of the arm segments $3212_1$-$3212_6$ may further define a proximal end or proximal direction and a distal end or distal direction. For example, each of the arm segments $3212_1$-$3212_6$ may have a respective proximal end and a respective distal end. The proximal end may be closer to the robot base 3202, while the distal end may be further downstream, such that it is farther from the robot base 3202. As an example, the arm segment $3212_3$ may have a proximal end that is directly connected to the arm segment $3212_2$, and may have a distal end that is directly connected to the arm segment $3212_4$. Further, if an arm segment (e.g., $3212_4$, $3212_5$, or $3212_6$) is directly or indirectly connected to the distal end of another arm segment (e.g., $3212_3$), the former arm segment (e.g., $3212_4$, $3212_5$, or $3212_6$) may be considered distal to the latter arm segment (e.g., $3212_3$). Conversely, if an arm segment (e.g., $3212_3$, $3212_4$, $3212_5$) is directly or indirectly connected to a proximal end of another arm segment (e.g., $3212_6$), the former arm segment (e.g., $3212_3$, $3212_4$, $3212_1$)

may be considered proximal to the latter arm segment (e.g., $3212_6$). As another example, the arm segment $3212_3$ may be considered a distal arm segment relative to the arm segment $3212_2$ and relative to the arm segment $3212_1$, while the arm segments $3212_1$ and $3212_2$ may be considered proximal arm segments relative to the arm segment $3212_3$.

Figure 3B:
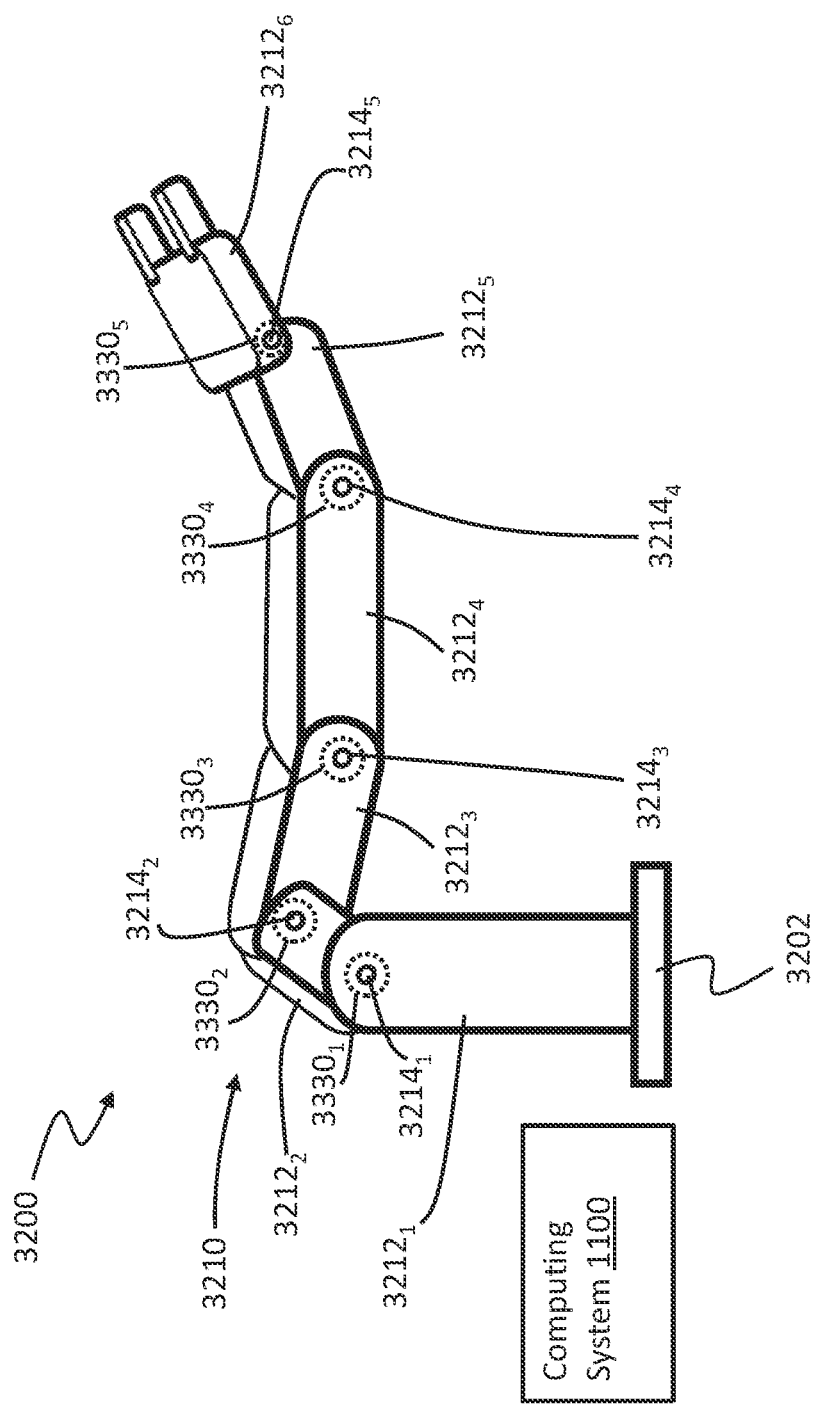

In an embodiment, as illustrated in FIG. 3B, the robot 3200 may include a plurality of actuators $3330_1$, $3330_2$, $3330_3$, $3330_4$, and $3330_5$ (which may be embodiments of the actuators $1230_1$ through $1230_n$) for causing movement of the respective arm segments $3212_2$-$3212_6$, or more specifically for causing relative movement between respective pairs of immediately adjacent arm segments. In some instances, the plurality of actuators $3330_1$ through $3330_1$ may be disposed at or near the joints $3214_1$ through $3214_5$, respectively. In some implementations, the actuators $3330_1$-$3330_5$ may be motors that are disposed around the joints $3214_1$-$3214_5$, and may output torque or force at the joints $3214_1$-$3214_5$. The actuators $3330_1$ through $3330_5$ may each output a respective force or torque for moving a respective one of the arm segments $3212_2$-$3212_6$ relative to an adjacent arm segment (or relative to some other reference frame). As an example, the actuator $3330_3$ may be disposed at or near the joint $3214_3$, which directly connects a pair of arm segments $3212_3$, $3212_4$. The actuator $3330_3$ may output a torque at the joint $3214_3$, which may cause relative rotation between the pair of arm segments $3212_3$, $3212_4$. More specifically, the torque may cause the more distal arm segment $3212_4$ of the pair of arm segments $3212_3$, $3212_4$ to rotate relative to the more proximal arm segment $3212_3$ of the pair of arm segments. Further, the arm segment $3212_4$ may rotate about the joint $3214_3$. In an embodiment, the actuators $3330_1$-$3330_5$ may include motors (e.g., electrical and/or magnetic motors), pumps (e.g., hydraulic pumps or pneumatic pumps), some other actuators, or a combination thereof.

Figure 3C:
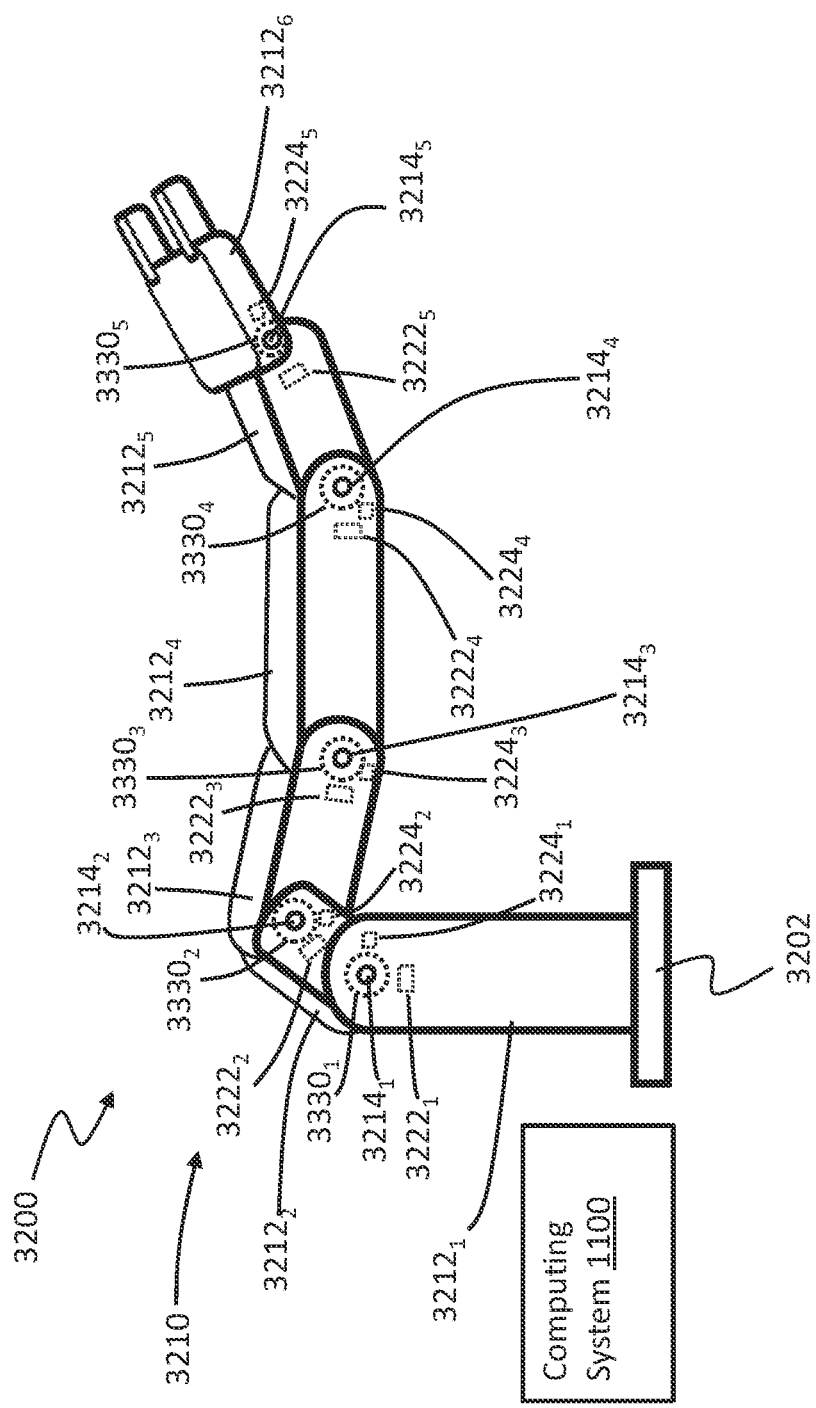

In an embodiment, the robot 3200 may include a set of sensors for generating sensor data which may be used in performing robot calibration. For instance, as illustrated in FIG. 3C, the robot 3200 may include a first set of sensors $3222_1$, $3222_2$, $3222_3$, $3222_4$, and $3222_5$ for generating actuation data and a second set of sensors $3224_1$, $3224_2$, $3224_3$, $3224_4$, and $3224_5$ for generating movement data. More specifically, the first set of sensors $3222_1$-$3222_5$ (which may be an embodiment of the sensors $1222_1$ through $1222_n$) may each be configured to generate a respective set of actuation data that relates to actuation of a respective arm segment of the plurality of arm segments $3212_2$-$3212_6$. More particularly, the set of actuation data for a particular arm segment may measure a parameter indicative of force or torque exerted on or experienced by the arm segment. For instance, the sensor $3222_1$ may generate a first set of actuation data that corresponds to the actuation of the arm segment $3212_2$ relative to the arm segment $3212_1$ (or vice versa), while the sensor $3222_2$ may generate a second set of actuation data that corresponds to the actuation of the arm segment $3212_3$ relative to the arm segment $3212_2$ (or vice versa). As another example, the sensor $3222_3$ may generate a third set of actuation data that corresponds to the actuation of the arm segment $3212_4$ relative to the arm segment $3212_3$ (or vice versa), while the sensor $3222_4$ may generate a fourth set of actuation data that corresponds to the actuation of the arm segment $3212_5$ relative to the arm segment $3212_4$ (or vice versa).

In an embodiment, the sensors $3222_1$-$3222_5$ may be or may include force sensors or torque sensors that are each configured to directly measure an overall force or torque at the joints $3214_1$-$3214_5$, or more specifically the overall force or torque on the arm segments $3212_2$-$3212_6$ connected at those joints. In an embodiment, the sensors $3222_1$-$3222_5$ may include electrical current sensors or voltage sensors configured to measure electrical current or electrical voltage. In one example, the sensors $3222_1$-$3222_5$ may be electrical current sensors that are configured to measure respective amounts of electrical current flowing through the actuators $3330_1$-$3330_5$. In this example, each of the sensors $3222_1$-$3222_1$ may be electrically connected in series with a respective actuator (e.g., motor) of the actuators $3330_1$-$3330_5$. The sensor may measure an amount of electrical current flowing through itself, which may be equal to or substantially equal to an amount of electrical current being provided to, drawn by, or otherwise flowing through the respective actuator. The amount of electrical current flowing through the actuator may be indicative of an overall force or overall torque at a corresponding joint at which the actuator is located. In some instances, the joint, or the arm segment at the joint, may act as a mechanical load being driven by the actuator, and the amount of electrical current flowing through the actuator may depend on how much voltage is being provided to activate the actuator and depend on a characteristic of the mechanical load, such as whether the load is being influenced by a torque other than that provided by the actuator (e.g., a torque caused by gravity), and/or whether motion of the load is being resisted by another torque (e.g., a resistance torque due to friction). As an example, the sensor $3222_4$ may measure an amount of electrical current flowing through the actuator $3330_4$, which may be indicative of an overall force or torque at the joint $3214_4$, or more specifically an overall force or overall torque on the arm segment $3212_5$ or the arm segment $3212_4$ (for rotating the arm segment $3212_5$ and/or $3212_4$ relative to a pivot point provided by the joint $3214_4$).

In some instances, the actuation data generated by the sensors $3222_1$-$3222_5$ may have values equal to how much electrical current is flowing through the corresponding actuators $3330_1$-$3330_5$. In such instances, the computing system 1100 may be configured to calculate or otherwise determine values of overall torque or overall force based on the electrical current values represented by the actuation data. In some instances, the sensors $3222_1$-$3222_1$ themselves may be configured to calculate or otherwise determine the values of overall torque or overall force, and to provide the torque values or force values as part of the actuation data. The calculation may be based on, e.g., a defined relationship (e.g., predefined relationship) between electrical current and overall torque or overall force, such as a relationship in which the overall torque is equal to or based on a defined constant (which may be referred to as a torque constant) multiplied by the electrical current. Thus, the computing system 1100 may be configured to perform the above calculation of overall torque by multiplying the torque constant by values of electrical current measured by the sensors $3222_1$-$3222_5$. In some implementations, the computing system 1100 (and/or the sensors $3222_1$-$3222_5$) may have access to stored actuator information that may provide a value for the torque constant. For example, the torque constant may be a value that is stored in the non-transitory computer-readable medium 1120.

As stated above, the second set of sensors $3224_1$-$3224_1$ in FIG. 3C may generate respective sets of movement data. In some implementations, the second set of sensors $3224_1$-$3224_5$ may be disposed at or near the joints $3214_1$-$3214_5$, respectively. The respective sets of movement data generated by the sensors $3214_1$-$3214_5$ may measure or otherwise describe movement of the arm segments $3212_2$-$3212_6$, respectively, or more specifically describe relative movement between respective pairs of arm segments connected by the joints $3214_1$-$3214_5$. For example, the sensor $3224_5$ may measure or otherwise describe movement of the arm segment $3212_6$ relative to the joint $3214_5$ and relative to the arm segment $3212_5$, or more specifically describe relative movement between the pair of immediately adjacent arm segments $3212_6$, $3212_5$, which are directly connected by the joint $3214_5$. In the above example, the arm segment $3212_6$ may be a more distal arm segment of the pair, while the arm segment $3212_5$ may be a more proximal arm segment of the pair. As another example, the sensor $3224_4$ may measure or otherwise describe movement of the arm segment $3212_5$ relative to the joint $3214_4$ and relative to the arm segment $3212_4$.

Figure 3D:
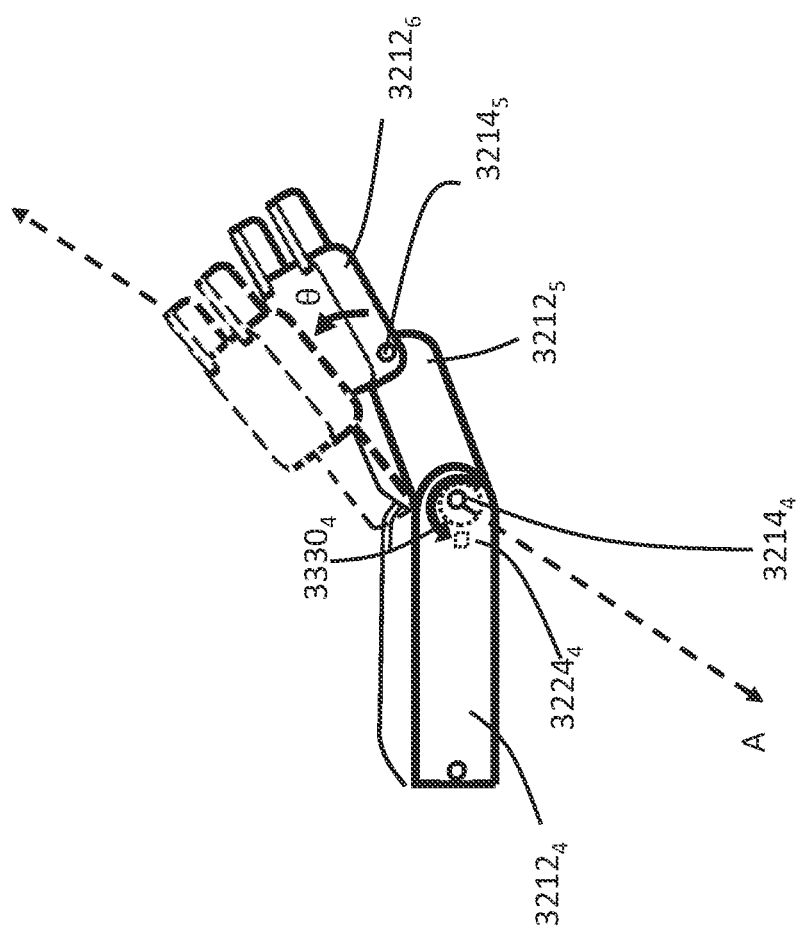
Figure 3E:
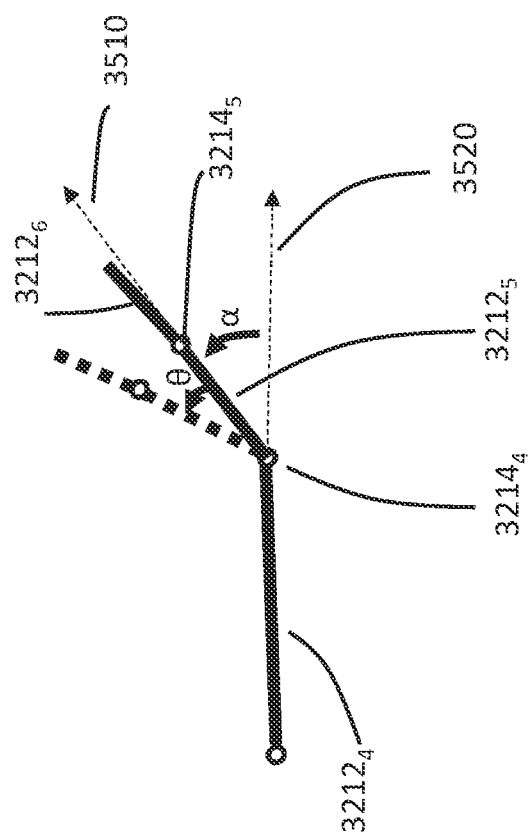

In an embodiment, the movement data may measure or otherwise describe an amount or rate of movement of an arm segment. The amount or rate of movement may be measured relative to a baseline position, such as a position of a joint to which the arm segment is connected, a position of the arm segment before it began moving, a position of a proximal arm segment that is immediately adjacent to the moving arm segment, or some other baseline position (also referred to as a reference position). In some instances, the amount of movement may refer to a position of the arm segment relative to the baseline position. If the movement involves rotation of the arm segment, the amount of movement (or, more specifically, the amount of rotation), may in some instances refer to a rotational position of the arm segment (also referred to as angular position, rotational displacement, or angular displacement). The rotational position of the arm segment may be measured relative to the baseline position. As an example, FIG. 3D illustrates a situation in which the arm segment $3212_5$ rotates relative to the joint $3214_4$ and relative to the arm segment $3212_4$ about a rotational axis A that extends through the joint $3214_4$, wherein the joint $3214_4$ may directly connect the two arm segments. In this example, the rotational position of the arm segment $3212_5$ may be indicated by an angle θ, which measures how much the arm segment $3212_1$ has rotated relative to a baseline position. As stated above, various positions may be used as the baseline position. In one example, as illustrated by a simplified diagram of the arm segments $3212_4$ and $3212_1$ in FIG. 3E, the baseline position may be a position 3510 of the arm segment $3212_5$ (e.g., orientation of the arm segment) when it was stationary relative to the joint $3214_4$ and relative to the arm segment $3212_4$, such that the angle θ for the rotational position may measured from the position 3510. In FIG. 3E, the baseline position 3510 may form an angle α (e.g., nonzero angle) with a horizontal position. More specifically, an orientation associated with the baseline position 3510 may form the angle α with a horizontal orientation, which may be an orientation that is perpendicular to a direction of gravity. The angle α is discussed below in more detail.

In an embodiment, the movement data may measure or otherwise describe a rate by which an arm segment (e.g., $3212_5$) is rotating or otherwise moving. The rate of movement may be measured relative to the baseline position discussed above. In some instances, the rate of movement of one arm segment about a joint (e.g., $3214_4$) may be measured relative to that joint, or relative to an immediately adjacent arm segment (e.g., $3212_4$). In some implementations, the rate of movement may refer to a speed, velocity, or acceleration (e.g., rotational speed, rotational velocity, or rotational acceleration). In this example, rotational speed may refer to a magnitude of the rotational velocity, while the rotational velocity may further describe a direction of rotation (e.g., clockwise or counterclockwise). In an embodiment, the computing system 1100 may be configured to determine additional movement data based on movement data generated by the sensors $3224_1$-$3224_5$. For example, if the sensors $3224_1$-$3224_5$ directly measure rotational position, and provides that measurement in the movement data, the computing system 1100 may be configured to determine rotational velocity and/or rotational acceleration based on the rotational position (e.g., as a time-based derivative of the rotational position). In an embodiment, the second set of sensors $3224_1$-$3224_1$ may include angular displacement sensors, linear displacement sensors, other sensors configured to generate movement data, or a combination thereof.

Figure 4:
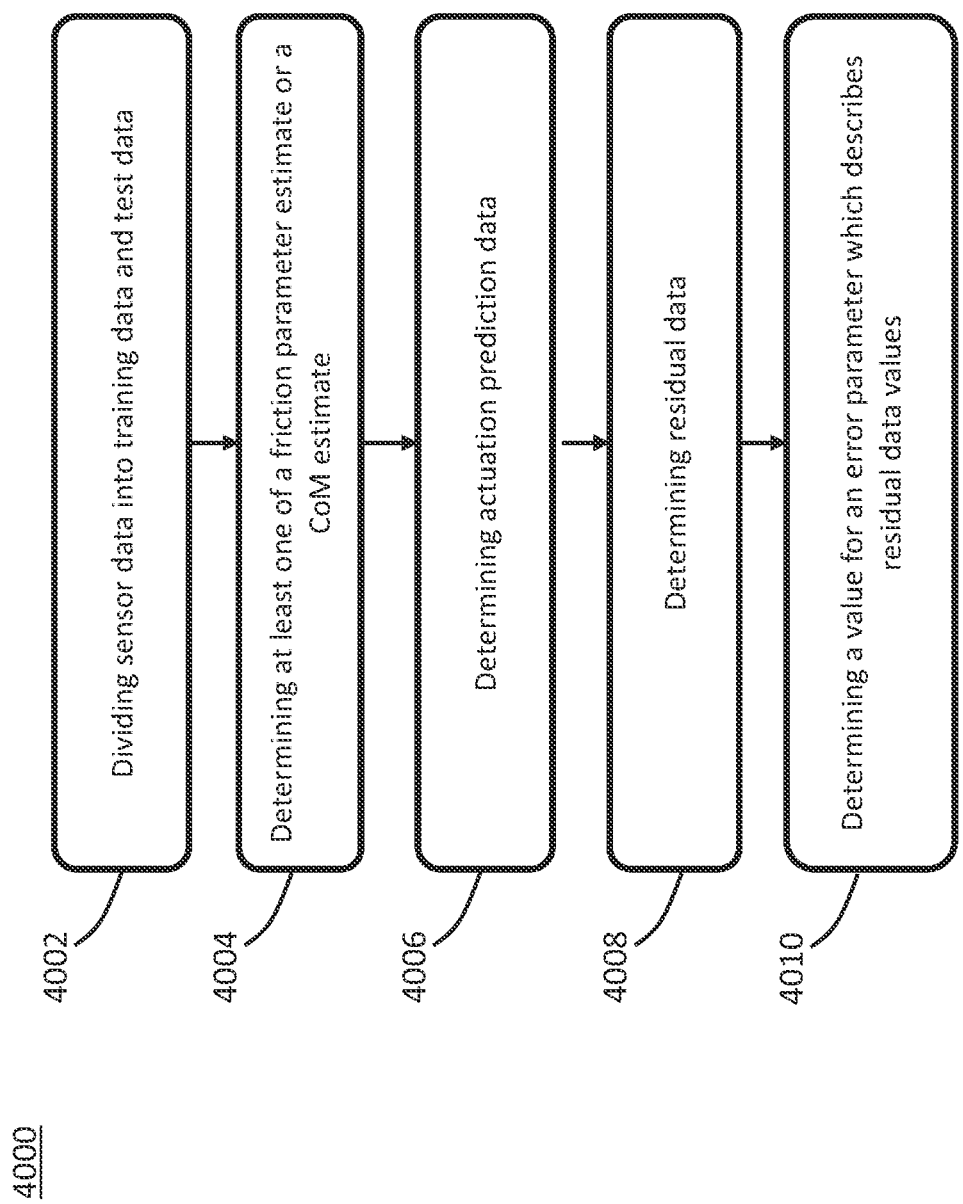
FIG. 4 illustrates a flow diagram which illustrates an example method for determining a value of an error parameter which is indicative of a reliability or accuracy of a result of robot calibration, or a quality of sensor data used to perform the robot calibration, consistent with embodiments hereof.

As discussed above, one aspect of the present disclosure relates to assessing an accuracy, quality, or reliability of robot calibration, or more specifically of a model and/or sensor data used to perform the robot calibration, and/or of estimated values (e.g., friction parameter estimate, CoM estimate, or estimate of some other physical property) determined from the robot calibration. In some instances, the assessment may be made based on an error parameter that indicates a deviation between actuation prediction data values and actuation test data values, as discussed below in more detail. FIG. 4 depicts a flow diagram for an example method 4000 for determining a value for such an error parameter (the value may also be referred to as an error parameter value). In some scenarios, the method 4000 may be performed as part of a robot calibration operation. One skilled in the art will realize that FIG. 4 illustrate one example of a method for determining the value of the error parameter, and more generally for performing the assessment discussed above, and that other example methods for performing this assessment may have fewer steps, more steps, and/or different steps than the method 4000. In an embodiment, the method 4000 may be performed by the computing system 1100, or more specifically by at least the processing circuit 1110 of the computing system 1100, such as when the processing circuit 1110 is executing instructions stored on the non-transitory computer-readable medium 1120 (e.g., instructions for the robot calibration module 1122).

In an embodiment, some or all of the steps of method 4000 may be performed multiple times, wherein the multiple times may correspond to multiple iterations. While the discussion below regarding the steps of method 4000 may illustrate one iteration of those steps, additional iterations may be performed. Each iteration may be used to determine a respective error parameter value for a particular component, such as an arm segment or joint, on which robot calibration is performed, or for a particular set of estimated values or other information determined from the robot calibration. For example, one iteration or set of iterations may be performed during one time period to determine a respective error parameter value for a CoM estimate and friction parameter estimate associated with a particular arm segment, particular joint, or particular pair of adjacent arm segments connected by the joint, while a next iteration or next set of iterations may be performed during another time period to determine a respective error parameter value for a CoM estimate and friction parameter estimate associated with another arm segment, another joint, or another pair of arm segments connected by this other joint. In an embodiment, the steps of method 4000 may be performed during one time period to determine one error parameter value, and some or all of the steps may be repeated during another time period to determine another error parameter value.

In an embodiment, the method 4000 may begin with or otherwise include a step 4002, in which the computing system 1100 divides sensor data, such as the sensor data 1124 of FIG. 2C, into training data and test data. In some instances, the sensor data (e.g., 1124) may be stored on the computing system 1100, such as on the non-transitory computer-readable medium 1120, or may be stored elsewhere. The stored sensor data (e.g., 1124) may include, e.g., stored movement data (e.g., 1127) and stored actuation data (e.g., 1128). The sensor data may be generated by one or more sensors, such as the sensors $1222_1$-$1222_n$ or $3222_1$-$3222_5$ and the sensors $1224_1$-$1224_n$ or $3224_1$-$3224_5$ of FIGS. 1C and 3C. For example, if method 4000 includes an iteration for determining an error parameter value associated with performing robot calibration on the arm segment $3212_5$ or the joint $3212_4$ to estimate a physical property or properties thereof, then the sensor data in that iteration may include a set of actuation data generated by, e.g., the sensor $3222_4$ and include a set of movement data generated by, e.g., the sensor $3224_4$. If the method 4000 includes another iteration for determining an error parameter value associated with performing robot calibration on the arm segment on another arm segment or another joint, such as arm segment $3212_4$ or the joint $3214_3$, then the sensor data in that iteration may include a set of actuation data generated by, e.g., the sensor $3222_3$ and include a set of movement data generated by, e.g., the sensor $3224_3$.

In some implementations, the method 4000 may include one or more steps, which may be performed by the computing system 1100 before step 4002, for obtaining or otherwise receiving the sensor data. For example, these one or more steps may involve the computing system 1100 generating a set of one or more movement commands for causing relative movement between a first arm segment (e.g., $3212_5$) and a second arm segment (e.g., $3212_4$) via a joint directly connecting the two arm segments (e.g., via $3214_4$), which may be immediately adjacent arm segments. In some instances, the one or more movement commands may be used for activating a first actuator (e.g., $3330_4$) of the plurality of actuators, and may be outputted or otherwise communicated by the computing system 1100 to the first actuator (e.g., $3330_4$) via the communication interface 1130 of FIG. 2B. For example, if the first actuator (e.g., $3330_4$) is a motor, the one or more movement commands may each be a motor command for activating the motor. Movement commands are discussed in more detail in U.S. patent application Ser. No. 17/243,939 (MJ0062-US/0077-0015US1), entitled METHOD AND COMPUTING SYSTEM FOR ESTIMATING PARAMETER FOR ROBOT OPERATION, the entire content of which is incorporated by reference herein. When an actuator (e.g., $3330_4$) receives the one or more movement commands, the actuator may output motion at a joint, or more specifically output a force or torque to cause motion at the joint. As stated above, motion at a joint may refer to the joint itself moving (e.g., rotating), or refer to relative rotation between two arm segments (e.g., $3212_4$, $3212_5$) that are directly connected by the joint (e.g., $3214_4$).

Figure 5A:
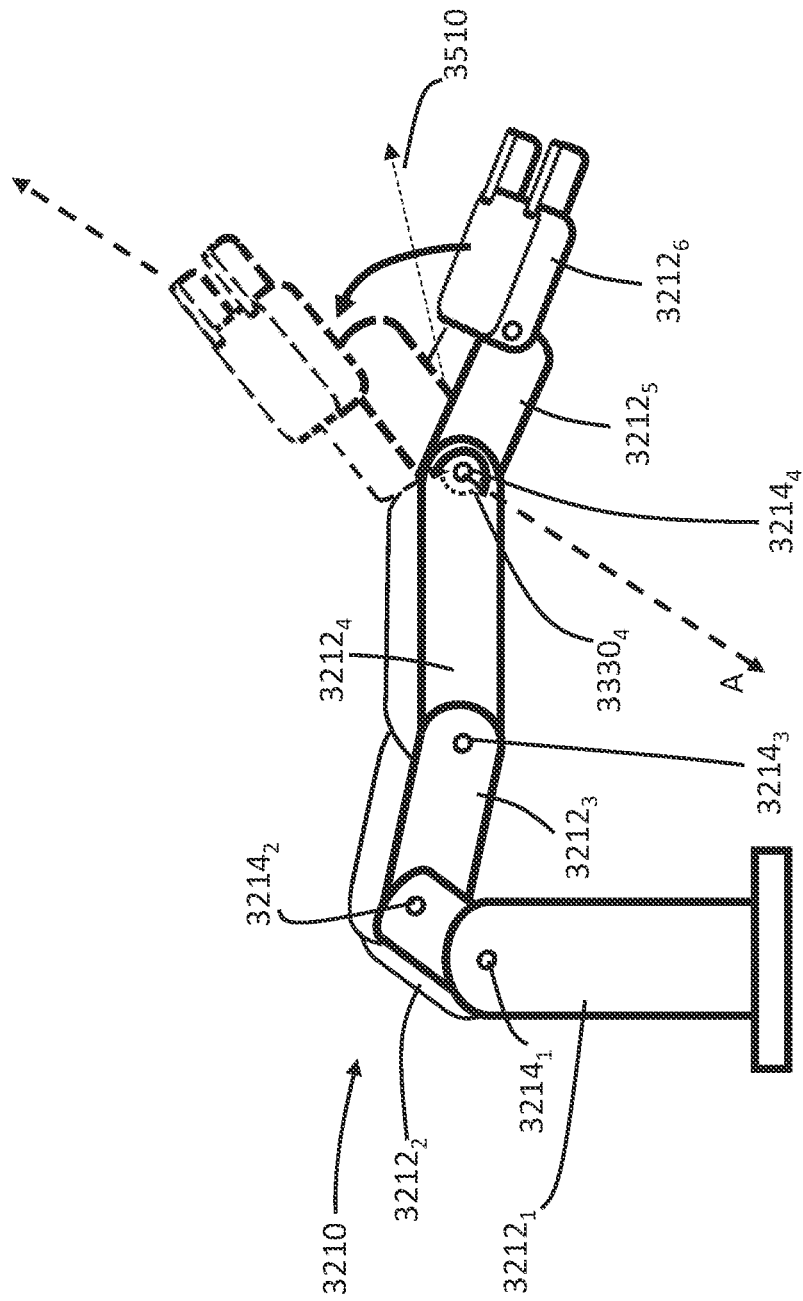
FIGS. 5A and 5B illustrate movement of an arm segment, consistent with embodiments hereof.
Figure 5B:
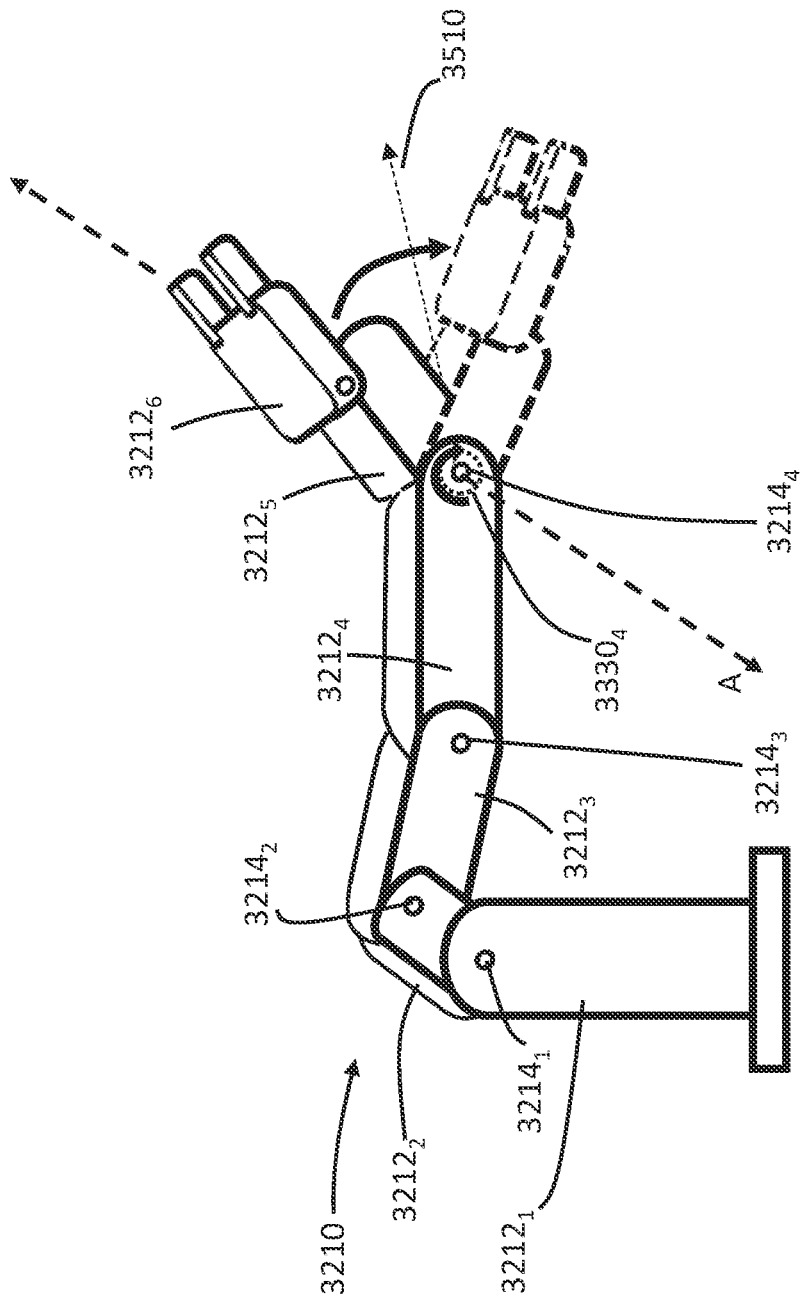

For example, FIGS. 5A and 5B illustrate motion that includes the arm segment $3212_5$ rotating relative to the arm segment $3212_4$ via the joint $3214_4$, which directly couples the two arm segments. The motion may be caused by one or more movement commands that activate actuator $3330_4$, which may output a torque or force that may be exerted on the arm segment $3212_5$ or on the joint $3214_4$. The motion may include the arm segment $3212_5$ and a downstream arm segment $3212_6$ rotating in a counterclockwise direction relative to the arm segment $3212_4$, as illustrated in FIG. 5A, and include the arm segment $3212_5$ and the downstream arm segment $3212_6$ rotating in a clockwise direction relative to the arm segment $3212_4$, as illustrated in FIG. 5B. More particularly, the arm segment $3212_5$ in FIG. 5A may be rotating in the counterclockwise direction from a start position to an intermediate position, while the arm segment $3212_5$ in FIG. 5B may be rotating in an opposite direction from the intermediate position to an end position.

Figure 6A:
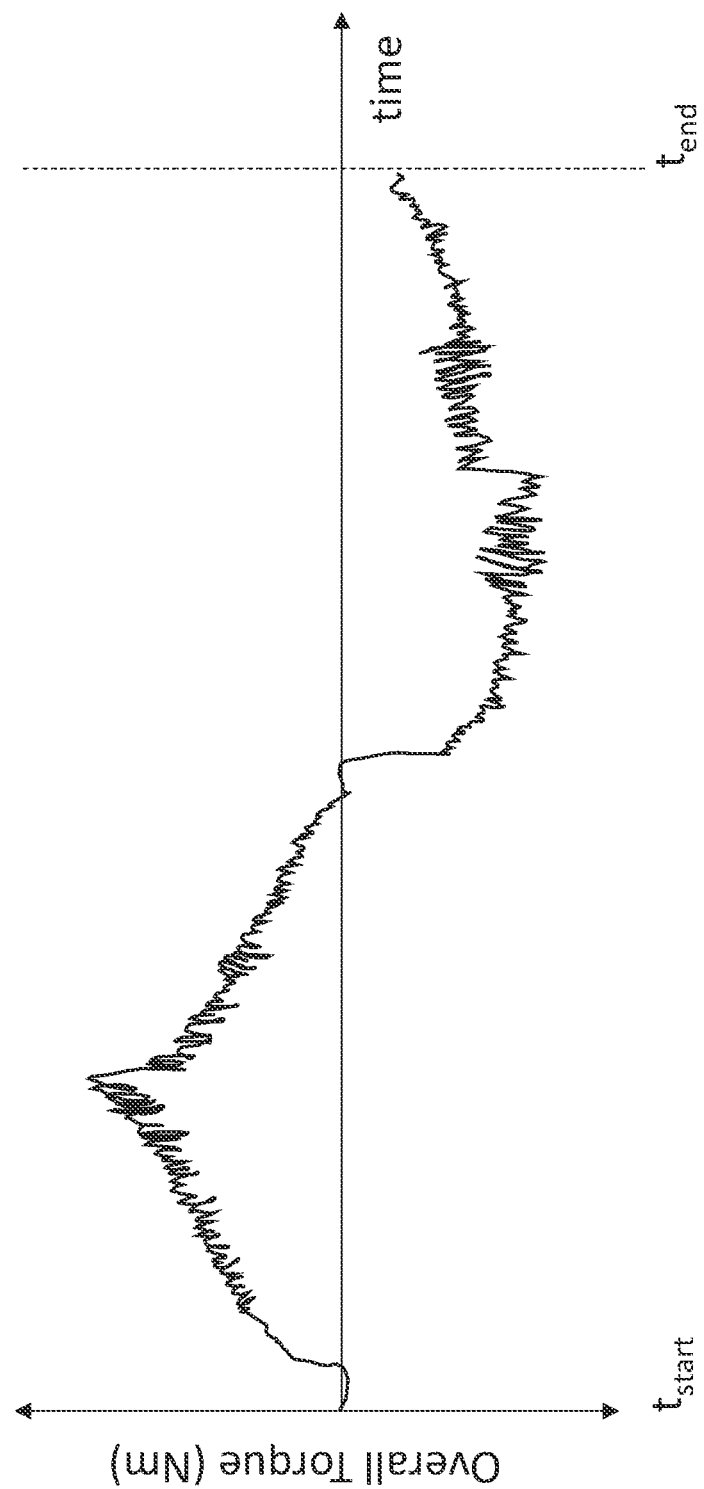
FIGS. 6A-6C illustrate actuation data and movement data, consistent with embodiments hereof.

In an embodiment, one or more sensors (e.g., sensor $3222_4$ and $3224_4$) may, during a time period in which the motion between the arm segments is occurring, generate a set of actuation data, a set of movement data, and/or other sensor data. In some instances, the set of actuation data may be indicative of a force or torque being experienced by an arm segment or joint involved in the motion, such as the arm segment $3212_5$ and joint $3214_4$. As an example, FIG. 6A depicts a graph which represents actuation data generated by the sensor $3222_4$ during the time period in which the arm segment $3212_5$ is rotating relative to the arm segment $3212_4$ via the joint $3214_4$. The actuation data in the graph may indicate overall torque at the joint $3214_4$ or overall torque exerted on the arm segment $3212_1$ relative to the joint $3214_4$. The figure further depicts various points in time within the time period in which the motion is occurring, such as $t_{start}$ and $t_{end}$. In this example, $t_{start}$ may represent a start of the time period, in which overall torque may cause the arm segment $3212_5$ to rotate from the start position of FIG. 5A toward the intermediate position of the figure. At $t_{end}$, relative rotation between the immediately adjacent arm segments $3212_5$, $3212_4$ may stop. In the example of FIG. 6A, the actuation data may be a function of time. More particularly, the actuation data may include a plurality of actuation data values, which may correspond to a plurality of different points in time. A positive actuation data value in FIG. 6A may represent overall torque being in a first direction (e.g., counterclockwise direction), while a negative actuation data value in the figure may represent the overall torque being in a second direction (e.g., clockwise direction).

Figure 6B:
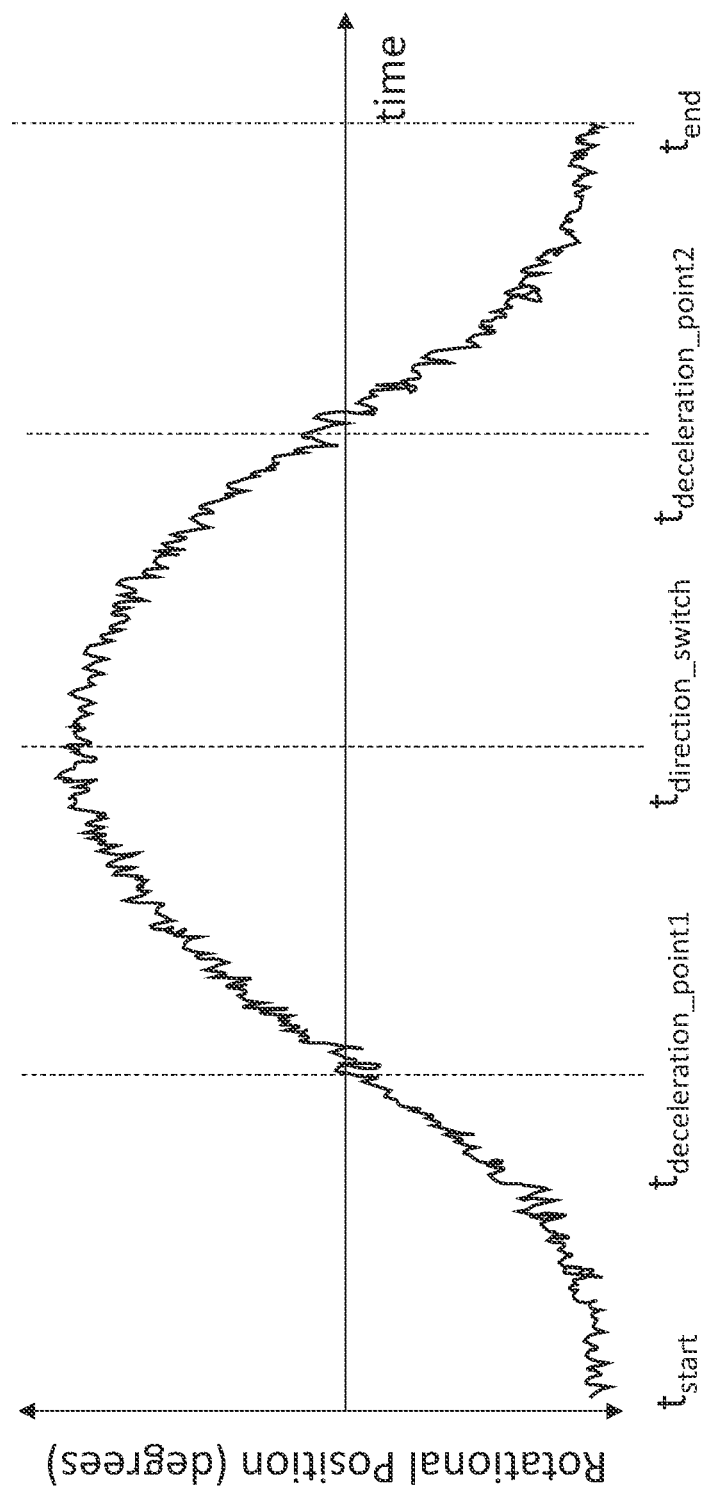

In an embodiment, the set of movement data generated by the one or more sensors, such as sensor $3224_4$, may describe the relative rotation or other motion. For instance, the set of movement data may describe an amount or rate of movement of the arm segment $3212_5$ relative to an immediately adjacent, upstream arm segment $3212_4$ via the joint $3212_4$. In some implementations, the movement data may include a plurality of movement data values, which may include values for rotational position, values for rotational velocity, and/or values for rotational acceleration. As an example, the amount of movement may be represented by a rotational position or displacement of the arm segment $3212_1$. More particularly, FIG. 6B illustrates movement data which is indicative of a rotational position of the arm segment $3212_5$ as a function of time. In this example, the rotational position or displacement may be measured relative to a baseline position, such as baseline position 3510. A positive value for the rotational position may refer to a position that is on one side of the baseline position (e.g., above the baseline position), while a negative value for the rotational position may refer to a position that is on the other side of the baseline position (e.g., below the baseline position).

Figure 6C:
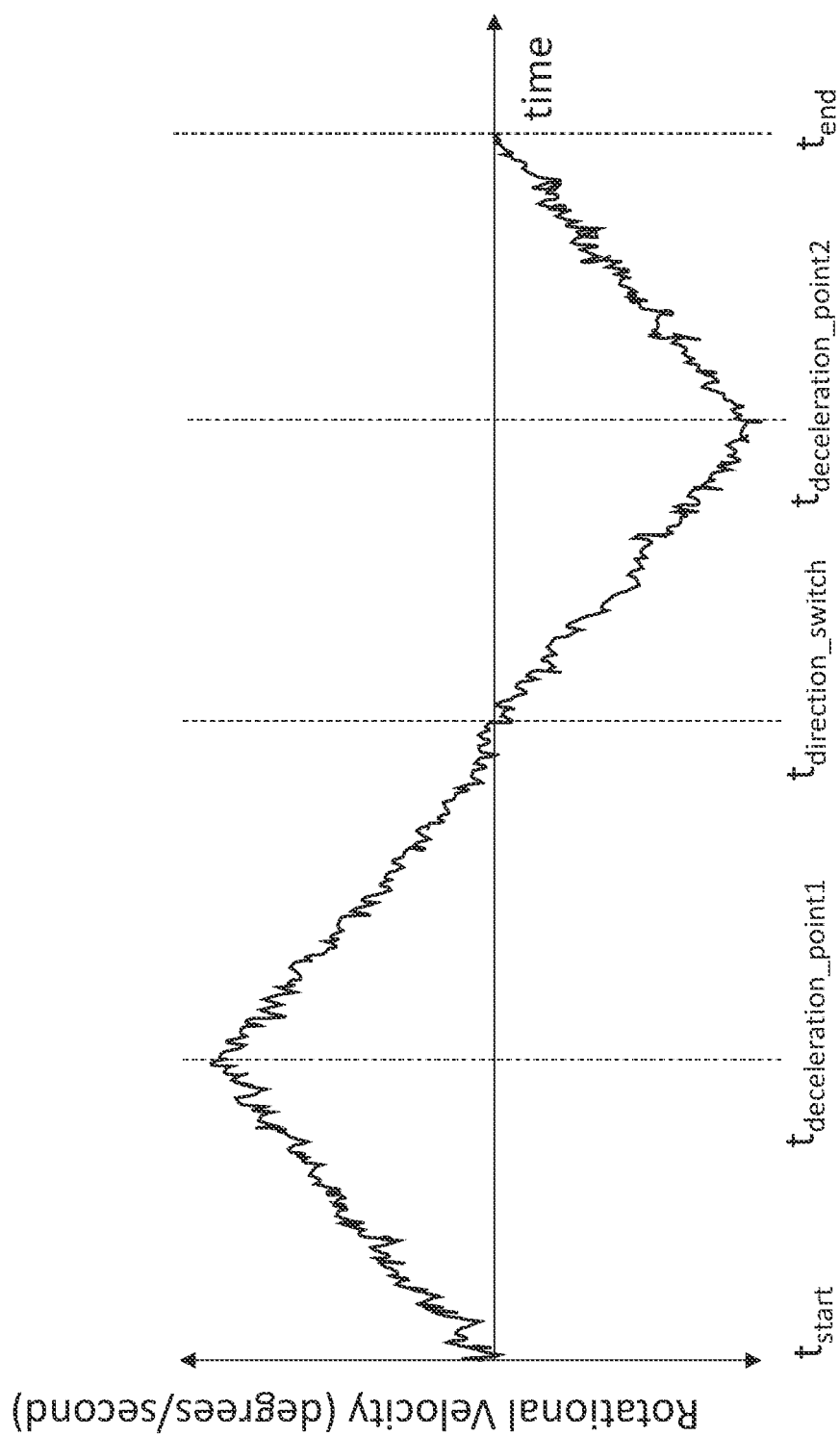

If the movement data is indicative of a rate of movement, the rate of movement may be represented by a rotational speed, rotational velocity, or rotational acceleration. More particularly, FIG. 6C illustrates rotational velocity of the arm segment $3212_5$ relative to the baseline position 3510, relative to the arm segment $3212_4$, or relative to some other reference frame. A positive value for the rotational velocity may refer to rotation in a first direction (e.g., counterclockwise direction), while a negative value for the rotational velocity may refer to rotation in a second direction (e.g., clockwise direction).

FIGS. 6B and 6C depict the points in time $t_{start}$ and $t_{end}$ within the time period in which the rotation is occurring, and further depicts additional points in time $t_{deceleration\_joint1}$, $t_{direction\_switch}$, $t_{decelertion\_point2}$. At $t_{start}$, the arm segment $3212_5$ may begin accelerating in the counterclockwise direction, so as to cause the arm segment $3212_5$ to rotate from the start position to the intermediate position of FIG. 5A. At $t_{deceleration\_point1}$, the arm segment $3212_5$ may continue rotating in the counterclockwise direction, but rotational acceleration and rotational velocity in that direction may begin decreasing in magnitude. At $t_{direction\_switch}$, the arm segment $3212_5$ may reach the intermediate position and pause or temporarily stop, before reversing a direction of rotation, to the clockwise direction. At this point in time, rotational acceleration and rotational velocity may begin to increase in magnitude in the clockwise direction, to cause the arm segment $3212_5$ to rotate from the intermediate position toward the end position of FIG. 5B. At $t_{deceleration\_point2}$, the arm segment $3212_5$ may continue rotating in the clockwise direction, but the rotational acceleration and rotational velocity may decrease in magnitude. At $t_{end}$, the arm segment $3212_5$ may reach the end position of FIG. 5B, and the rotational velocity may have decreased to zero in magnitude.

In an embodiment, the computing system 1100 may receive the actuation data, the movement data, and/or other sensor data generated by the one or more sensors, and store the sensor data in the non-transitory computer-readable medium 1120. FIGS. 7A-7C illustrate examples of the actuation data and movement data. More particularly, FIG. 7A illustrates an example in which the movement data include a plurality of values $\theta(t_1)$ through $\theta(t_z)$ that indicate rotational position of an arm segment, such as arm segment $3212_5$, in degrees or radians. The values $\theta(t_1)$ through $\theta(t_z)$, also referred to as rotational position values, or more generally movement data values, and may correspond to respective points in time $t_1$ through $t_z$, and may be relative to, e.g., the baseline position 3510 of FIGS. 5A and 5B. As an example, the rotational position values $\theta(t_1)$ through $\theta(t_z)$ may be the values represented by the graph of FIG. 6B. In such an example, $t_1$ may correspond to $t_{start}$, while $t_z$ may correspond to $t_{end}$.

Further in this example, the actuation data may include a plurality of values $\tau(t_1)$ through $\tau(t_z)$ that indicate overall torque exerted at a joint or arm segment, such as joint $3214_4$ or arm segment $3212_5$. These values $\tau(t_1)$ through $\tau(t_z)$ may also be referred to as torque values, or more generally actuation data values, and may correspond to the respective points in time $t_1$ through $t_z$. Thus, the rotational position values $\theta(t_1)$ through $\theta(t_z)$ may correspond to the torque values $\tau(t_1)$ through $\tau(t_z)$, respectively. As stated above, the actuation data may in some instances indirectly indicate the overall force or overall torque at an arm segment or joint. For instance, FIG. 7B illustrates an example in which the actuation data is proportional to/directly measures values of electrical current $c(t_1)$ to $c(t_z)$ flowing through a corresponding actuator (e.g., $3330_4$) used to output torque or force at the arm segment or joint. In such an instance, the computing system 1100 may be configured to determine the torque values $\tau(t_1)$ through $\tau(t_z)$ based on the measured electrical current values $c(t_1)$ to $c(t_z)$. FIG. 7C provides another example of the sensor data, or more specifically of movement data that directly indicate values of rotational velocity $\dot{\theta}(t_1)$ through $\dot{\theta}(t_z)$. These values may also be referred to as rotational velocity values, or more generally as movement data values. In an embodiment, the various examples of sensor data in FIGS. 7A-7C may be combined. For instance, the actuation data of FIG. 7B may be combined with the movement data of FIG. 7C.

Figure 8A:
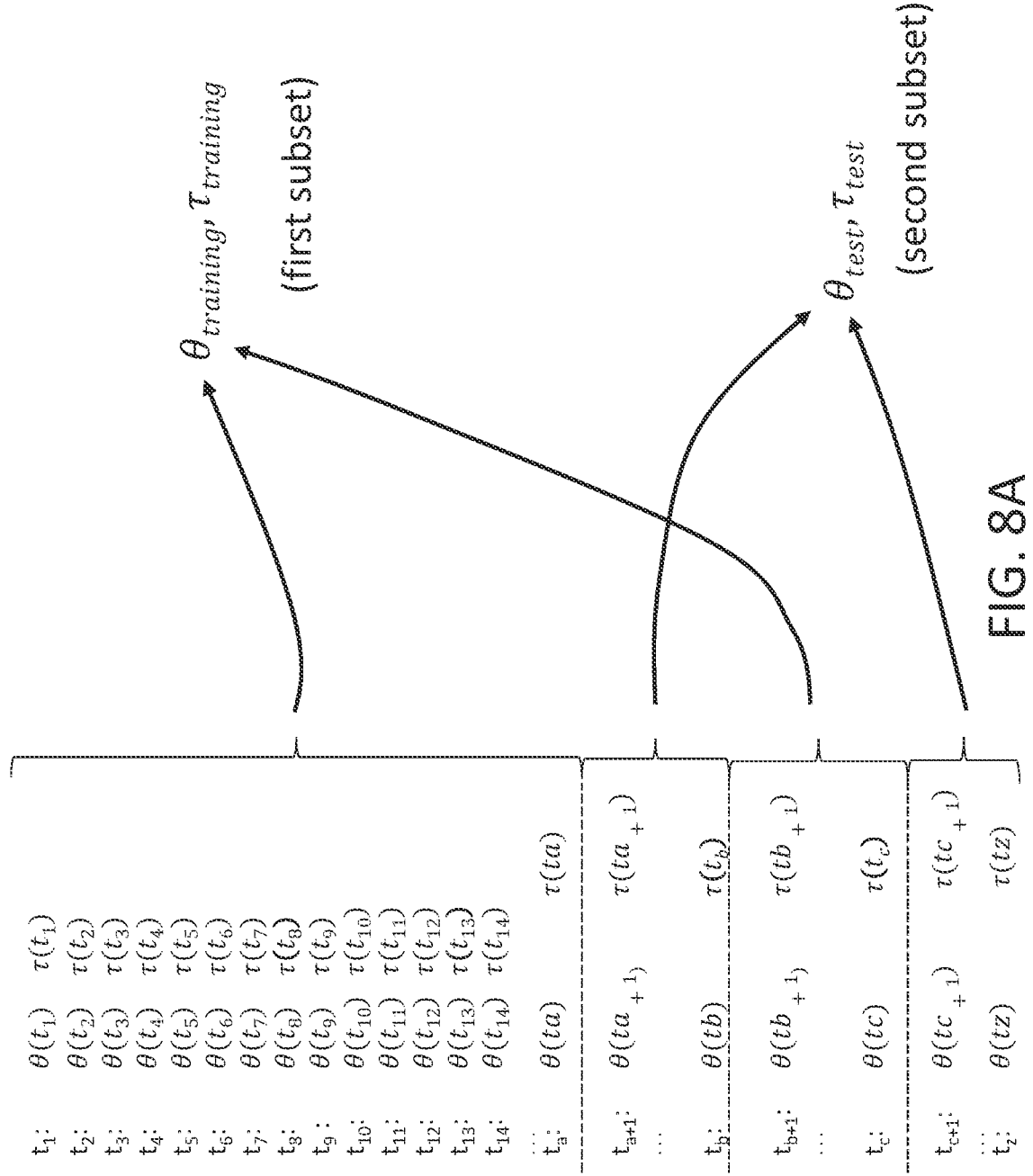
FIGS. 8A and 8B illustrate sensor data being divided into training data and test data, consistent with embodiments hereof.

As stated above, step 4002 may involve dividing sensor data into training data and test data. In an embodiment, the sensor data may be divided by selecting, as the training data, movement training data (also referred to as movement-related training data) and corresponding actuation training data (also referred to as actuation-related training data), and by selecting, as the test data, movement test data (also referred to as movement-related test data) and corresponding actuation test data (also referred to as actuation-related test data). In other words, the training data may include movement training data and actuation training data, while the test data may include movement test data and actuation test data. For instance, FIG. 8A depicts an example in which the sensor data of FIG. 7A is divided into training data and test data. The training data may include movement training data $\theta_{training}$ and actuation training data $\tau_{training}$, while the test data may include movement test data $\theta_{test}$ and actuation test data $\tau_{test}$. As depicted in FIG. 8A, the movement training data $\theta_{training}$ may be a first subset of the set of movement data (wherein the set includes movement data values $\theta(t_1)$ through $\theta(t_z)$), while the movement test data may be a second subset of the set of movement data. The actuation training data may be a first subset of the set of actuation data (wherein the set may include actuation data values $\tau(t_1)$ through $\tau(t_z)$), while the actuation test data may be a second subset of the set of actuation data $\tau(t_1)$ through $\tau(t_z)$. In some implementations, the subsets described above may have no overlap.

The sensor data may be divided in a variety of ways. In one example, the computing system 1100 may select a first half of consecutive values of the movement data as the movement training data, and select a second half of consecutive values of the movement data as the test data. The actuation training data and actuation test data may be selected in a similar manner. In another example, the computing system 1100 may select every other value of the movement data as the movement training data, and select remaining values of the movement data as test data, and select the actuation training data and actuation test data in a similar manner. In another example, FIG. 8A depicts the computing system 1100 selecting the movement training data that includes rotational position values $\theta(t_1)$ through $\theta(t_z)$. In this example, the computing system may select rotational position values $\theta(t_1)$ through $\theta(t_a)$ and rotational position values $\theta(t_{b+1})$ through $\theta(t_c)$ to be training data, wherein these values may form a first subset of the movement data. Similarly, the computing system 1100 may select the actuation training data to include the torque values $\tau(t_1)$ through $\tau(t_a)$ and torque values $\tau(t_{b+1})$ through $\tau(t_c)$, which may form a first subset of the actuation data. Further, the computing system 1100 may select the movement test data to include rotational position values $\theta(t_{a+1})$ through $\theta(t_b)$, and rotational position values $\theta(t_{c+1})$ through $\theta(t_z)$, which may form a second subset of the movement data. Similarly, the computing system 1100 may select the actuation test data to include the torque values $\tau(t_{a+1})$ through $\tau(t_b)$ and the torque values $\tau(t_{c+1})$ through $\tau(t_z)$, which may form a second subset of the actuation data.

In another example of dividing sensor data, the computing system 1100 may divide the sensor data in a manner that is symmetric with respect to position values and velocity values indicated by the movement data, or more specifically with respect to a relationship between position and velocity.

Figure 8B:
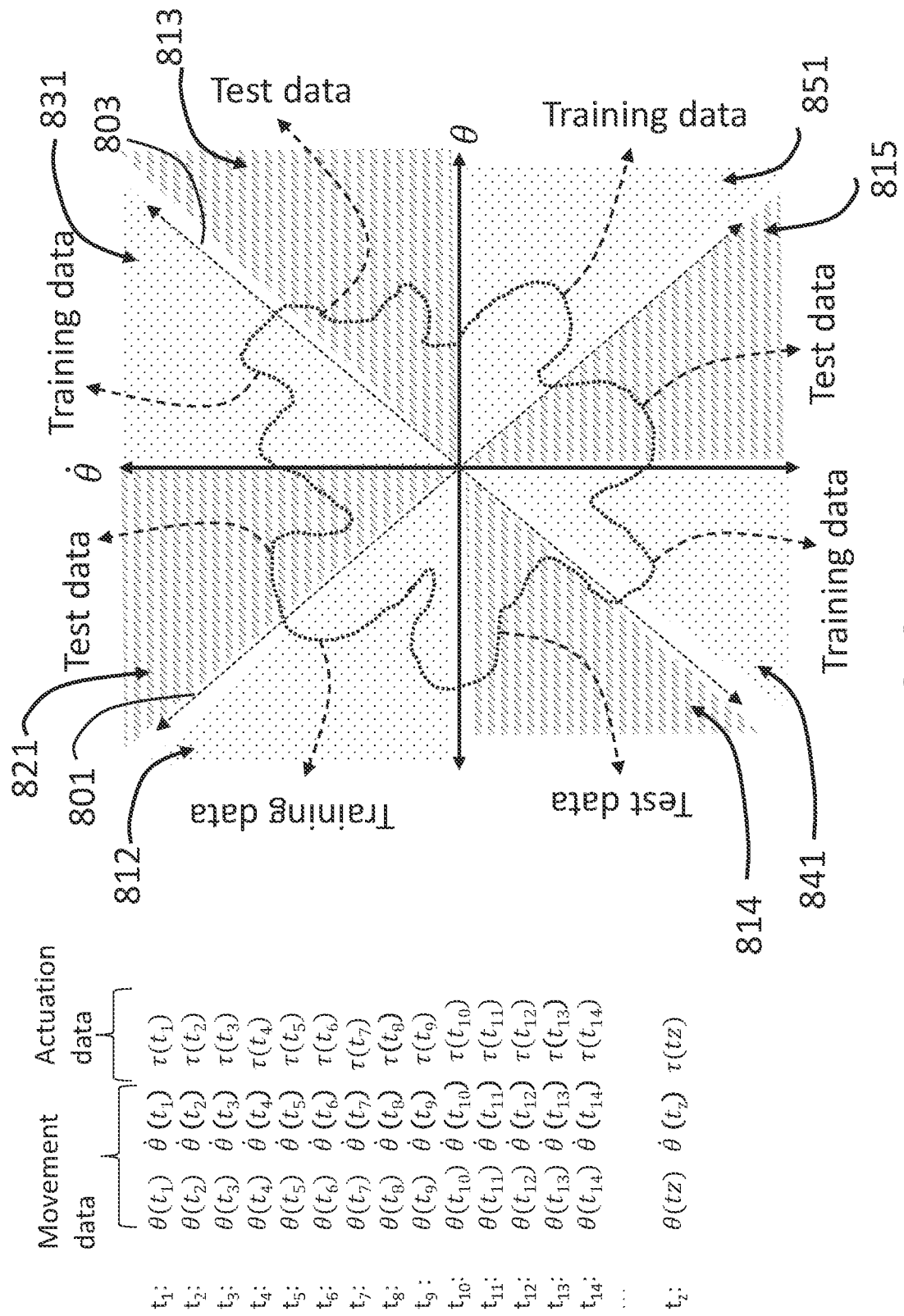

For instance, the relationship may refer to a ratio between rotational velocity and rotational position. More specifically, FIG. 8B depicts a coordinate system (e.g., polar coordinate system) which describes rotational position values and rotational velocity values. The rotational position values and rotational velocity values may be part of or derived from the movement data. For instance, the movement data stored in the non-transitory computer-readable medium 1120 may include rotational position values, and the computing system 1100 may determine rotational velocity values to be equal to or based on a time-based derivative of the rotational position values. The figure further depicts an imaginary line 801 and an imaginary line 803 that may divide the coordinate system into symmetric regions 812, 821, 813, 831, 814, 841, 815, and 851. In an embodiment, the imaginary line 801 may represent a defined ratio threshold between rotational velocity and rotational position, such as a ratio of $$1\frac{\text{(degree/second)}}{\text{degree}} = 1/\text{second or } -1\frac{\text{(degree/second)}}{\text{degree}}.$$

In an embodiment, the computing system 1100 may select a particular movement data value as training data or test data based on which region is the movement data value located. More specifically, the movement data value may include a rotational position value and/or a corresponding rotational velocity value. For instance, the movement data value may include the rotational position value, and the computing system may determine the rotational velocity value based on the rotational position value. The computing system 1100 may determine whether to select the movement data value as training data or test data based on which region is a combination of the rotational position value and corresponding rotational velocity value located. In some implementations, the computing system 1100 may make this determination based on the ratio between the rotational velocity value and the rotational position value. For instance, the imaginary line 801 may divide one quadrant of the coordinate system into a pair of regions 812, 821 that are symmetric to each other. The region 812 may represent movement data values for which respective ratios between their rotational velocity values and corresponding rotational position values is in a defined range that extends from a defined ratio threshold $$\left(e.g., -1\frac{\text{(degree/second)}}{\text{degree}}\right)$$

to 0. The defined ratio threshold may be a positive value or negative value (that is, a positive ratio threshold or a negative ratio threshold), and may be represented by a slope (e.g., −1) of the imaginary line 801. The defined ratio threshold may be stored or otherwise predefined within the non-transitory computer-readable medium 1120, or may be dynamically defined or otherwise determined by the computing system 1100. In some instances, a defined value in the present disclosure may be manually defined and stored in the non-transitory computer-readable medium 1120, or may be dynamically defined by the computing system 1100, and may also be stored in the non-transitory computer-readable medium 1120, or may be discarded after being used. In FIG. 8B, the region 821 may represent movement data values for which the respective ratios between rotational velocity values and corresponding rotational position values are less than the defined ratio threshold (e.g., less than −1). Thus, in this example, if a movement data value has a ratio between a corresponding rotational velocity value and a corresponding rotational position value that is within a range extending from the defined ratio threshold (e.g., −1) to 0, the movement data value may be selected as training data. The corresponding actuation data value may also be selected as training data (wherein the corresponding actuation data value may be an actuation data value describing the same point in time as the movement data value). If the movement data value has a ratio that is less than the defined ratio threshold, then the movement data value may be selected as test data.

As another example, the imaginary line 803 may divide another quadrant of the coordinate system into a pair of regions 813, 831 that are symmetric to each other. In this example, movement data values which fall within region 831 may be selected as movement training data, while movement data values which fall within region 813 may be selected as test data. The region 813 may represent movement data values for which respective ratios between their rotational velocity values and corresponding rotational position values are in a defined range that extends from 0 to another defined ratio threshold $$\left(e.g., 1\frac{\text{(degree/second)}}{\text{degree}}\right),$$

while the region 831 may represent movement data values for which the respective ratios between rotational velocity values and corresponding rotational position values are greater than the defined ratio threshold (e.g., greater than 1). The defined ratio threshold in this example may be represented by a slope of the line 803. Thus, in this example, if a movement data value has a ratio between a corresponding rotational velocity value and a corresponding rotational position value that is within a range extending from 0 to the defined ratio threshold (e.g., 1), the movement data value may be selected as test data. If the movement data value has a ratio that is greater than the defined ratio threshold (e.g., greater than 1), then the movement data value may be selected as training data. Dividing the sensor data in the manner described above may produce training data and test data which are symmetric, which may facilitate a more accurate estimation of parameters based on the training data, and/or facilitate a more accurate assessment of estimated parameters using the test data.

Returning to FIG. 4, the method 4000 may in an embodiment include a step 4004, in which the computing system 1100 may determine, based on the movement training data (e.g., $\theta_{training}$) and the actuation training data (e.g., $\tau_{training}$), at least one of: (i) a friction parameter estimate associated with friction between a pair of arm segments (e.g., 3212$_5$, 3212$_4$) that underwent the relative motion measured by the sensor data, or (ii) a center of mass (CoM) estimate associated with one of the pair of arm segments (e.g., 3212$_5$). In some implementations, the friction parameter estimate may be an estimate of a coefficient of viscous friction or an estimate of coulomb friction.

Figure 9A:
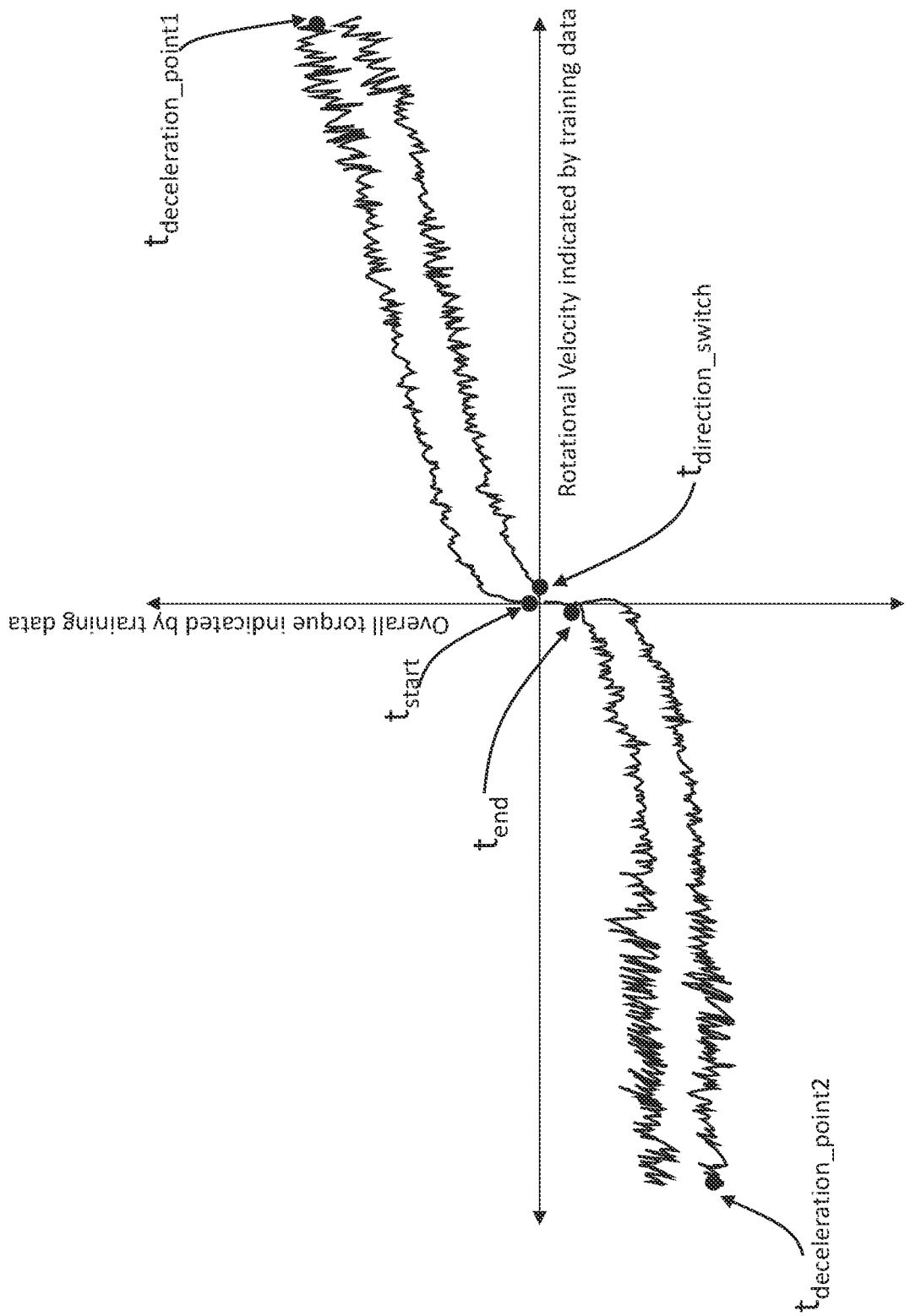
FIGS. 9A-9C illustrate an example of determining at least one friction parameter estimate based on training data, consistent with an embodiment hereof.
Figure 9B:
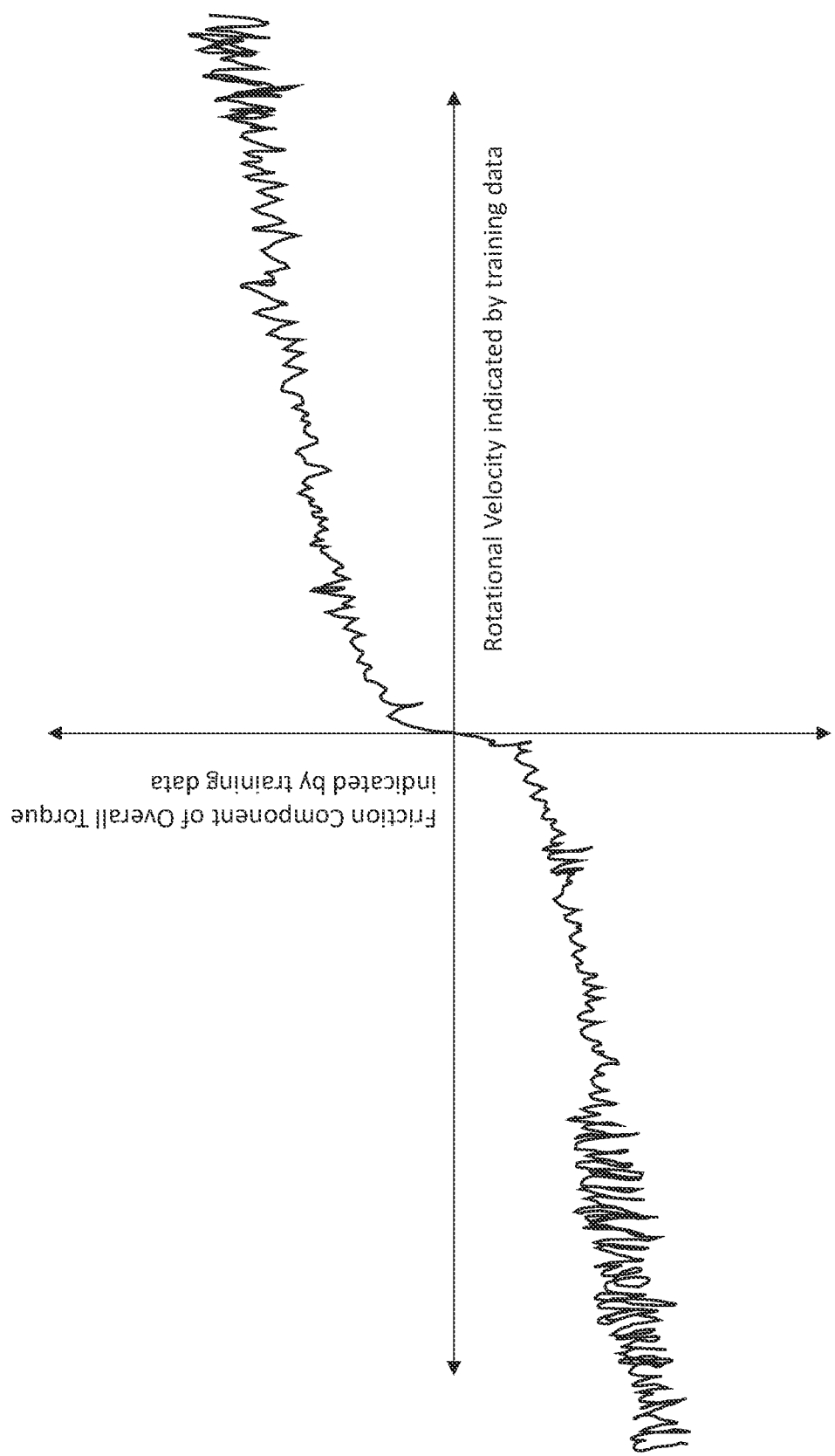
Figure 9C:
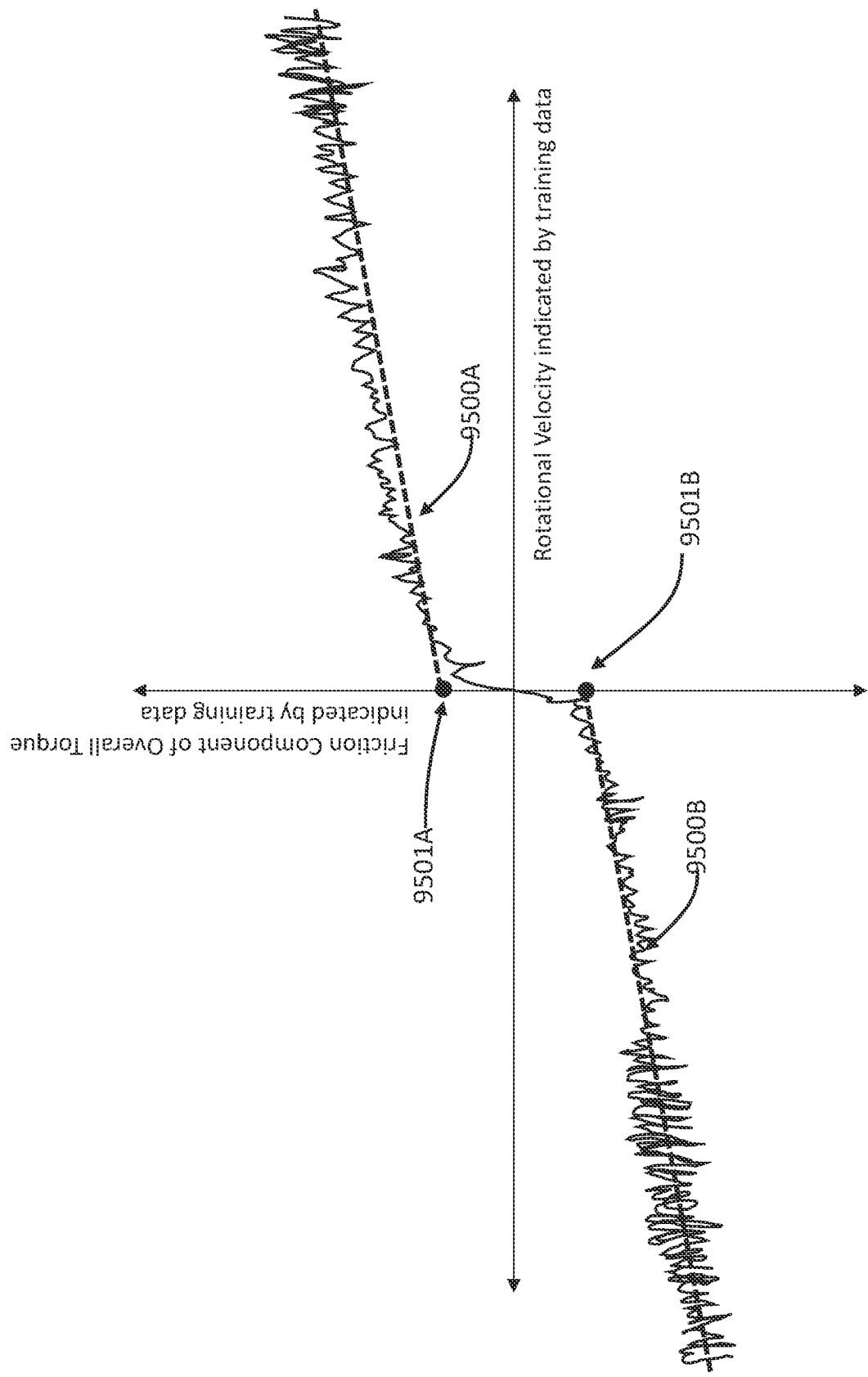

FIGS. 9A-9C illustrate an example of how a frictional parameter estimate may be determined based on actuation training data and movement training data. More particularly, FIG. 9A is a plot of combinations of: (i) values of overall torque indicated by the actuation training data $\tau_{training}$ and (ii) corresponding values of rotational velocity indicated by the movement training data $\theta_{training}$ (e.g., the rotational velocity values may be a time-based derivative of the rotational position values in $\theta_{training}$). Each combination of values may include a first value which represents overall torque at a joint (e.g., $3214_4$) at a respective point in time that is described by the training data, and a second value which represents rotational velocity at that point in time. For example, the first value may indicate overall torque on, e.g., a first arm segment (e.g., $3212_5$) relative to a second arm segment (e.g., $3212_4$) at a particular point in time, and the second value may indicate rotational velocity between the first arm segment and the second arm segment at that point in time. The plotted combination of values in FIG. 9A may correspond to, e.g., the rotation illustrated in FIGS. 5A and 5B and to the sensor data illustrated in FIGS. 6A-6C. For instance, FIG. 9A illustrates movement training data and actuation training data that represents rotational velocity increasing in magnitude in a first direction (e.g., counter-clockwise direction) during a time period from $t_{start}$ to $t_{deceleration\_point1}$, then decreasing in magnitude during a time period from $t_{deceleration\_point1}$ to $t_{direction\_switch}$, then switching from the first direction to a second direction (e.g., clockwise direction) and increasing in magnitude in the second direction during a time period from $t_{direction\_switch}$ to $t_{deceleration\_point2}$, and then decreasing in magnitude during a time period from $t_{deceleration\_point2}$ to $t_{end}$.

In an embodiment, the overall torque represented by the actuation training data may be based on a contribution from the inertia of the actuator between two adjacent arm (e.g., $3212_5$ and $3212_4$). In an embodiment, the overall torque may be based on a contribution from friction. More particularly, the overall torque may in some instances be described by the example equation:

$$\tau = \text{contribution from actuator} + \text{contribution from gravity} + \text{contribution from friction} \quad (1)$$

In the above equation, $\tau$ refers to the overall torque on a joint (e.g., $3214_4$), and may be equal to or derived from the actuation training data $\tau_{training}$. In this example, the contribution from the actuator may refer to a torque or force that is output by an actuator (e.g., $3330_4$). For instance, this contribution from the actuator may be represented by the term $I\ddot{\theta}$, in which $\ddot{\theta}$ represents rotational acceleration of a first arm segment (e.g., $3212_5$) relative to the second arm segment (e.g., $3212_4$), and in which I is a moment of inertia of the first arm segment. In an embodiment, the contribution from gravity in may refer to a torque caused by a weight of downstream segments, such as the first arm segment and the end effector apparatus, wherein the torque acts relative to a pivot point provided by the joint (e.g., $3214_4$). For instance, the contribution from gravity may represented by the term mgr cos $\theta$ or mgr sin $\theta$, in which $\theta$ represents a rotational position of the downstream segments relative to the gravity vector, while mg represents a weight contribution of the downstream segments. More specifically, m represents a mass of the downstream segments, while g represents a rate of gravitational acceleration (e.g., 9.8 m/sec$^2$). In this example, r represents a distance between a center of mass (CoM) of the first arm segment and the joint. In some implementations, the value of the mass m or weight mg may be a known value that is stored in the non-transitory computer-readable medium 1130.

In an embodiment, the contribution from friction may refer to how much resistance is provided by friction against motion or a change in motion of the first arm segment relative to the second arm segment or relative to the joint connecting the two arm segments. In some scenarios, the contribution from friction may be represented as $s+b\dot{\theta}$, in which s represents an amount of static friction (also referred to as coulomb friction) between the first arm segment and the second arm segment, $\dot{\theta}$ represents a rotational velocity of the first arm segment relative to a frame of reference provided by the second arm segment, and b represents a coefficient of viscous friction between the first arm segment and the second arm segment. In such a scenario, the static friction may remain constant during relative rotation between the first arm segment and the second arm segment, while the viscous friction may increase in magnitude as rotational velocity increases in magnitude.

In an embodiment, the computing system 1100 may be configured to effectively extract or otherwise determine, from the actuation training data $\tau_{training}$, the contribution from friction, which may also be referred to as a friction component of the overall torque. For instance, FIGS. 9B and 9C illustrate combination of values that represent, for various points in time, a friction component of overall torque. These values for the frictional component of overall torque may be combined with values of rotational velocity. In some instances, the computing system 1100 may be configured to extract the friction component of the overall torque by subtracting, from the overall torque indicated by the actuation training data, the contribution of the actuator and the contribution of gravity, if those contributions are known. For instance, if the computing system 1100 has previously determined an estimate for I (representing the moment of inertia) or an estimate for r (representing the CoM), the computing system 1100 may use those estimates, as well as values of $\theta$, $\dot{\theta}$, $\ddot{\theta}$ provided by or derived from the movement training data, to determine the contribution from the actuator (which may be estimated as $I\ddot{\theta}$) and the contribution from gravity (which may be estimated as mgr cos $\theta$). The computing system 1100 may then subtract out the contribution of the actuator and the contribution of gravity from the overall torque to extract the contribution of friction. In some instances, the computing system 1100 may effectively extract the friction component by solving a set of simultaneous equations that relate overall torque to friction, as discussed below in more detail.

As illustrated in FIG. 9C, the computing system 1100 may be configured to use a relationship between the friction component of the overall torque (which may be extracted from the actuation training data) and the rotational velocity (which may be provided by or extracted from the movement training data) to determine a friction parameter estimate. More particularly, the friction between two arm segments may include static friction and viscous friction. As discussed above, the static friction may in some instances be represented as a constant (s) while the viscous friction may be represented as being a linear function ($b\dot{\theta}$) of rotational velocity, such that the friction component of the overall torque may be approximated as $s+b\dot{\theta}$. In such instances, the computing system 1100 may apply a linear fit to the combination of values in FIG. 9C, which represent the friction component of overall torque. More particularly, the computing system 1100 may determine a line 9500A and/or 9500B which fits through or otherwise approximates the combination of values of FIGS. 9B and 9C. The line 9500A or 9500B may represent the above expression of $s+b\dot{\theta}$. More particularly, the computing system 1100 may determine the coefficient of viscous friction (b) to be equal to or based on a slope of the line 9500A or 9500B (or as an average of the respective slopes of those lines), and determine the static friction (s) to be equal to or based on a height of the line 9500A or 9500B (e.g., equal to the Y-intercept 9501A or 9501B, or an average of their magnitudes).

As stated above, the computing system 1100 may be configured to effectively extract the friction component by solving a set of simultaneous equations that relate overall torque to friction. As stated above, the overall torque r may be based on a contribution from the actuator, a contribution from gravity, and a contribution from friction. In one example, the overall torque may be based on the more specific relationship below:

$$\tau = [I^*\ddot{\theta}] + [mgr^*\sin(\theta+\alpha)] + [s^*\text{Sign}(\dot{\theta})] + [b^*\dot{\theta}] \text{ or} \quad (2)$$

$$\tau = [I^*\ddot{\theta}] + [mgr^*\cos(\theta+\alpha)] + [s^*\text{Sign}(\dot{\theta})] + [b^*\dot{\theta}] \quad (3)$$

In this example, values for the parameter r may be provided by or derived from the actuation training data. The parameters $\theta$, $\dot{\theta}$, $\ddot{\theta}$ (which may represent rotational position, rotational velocity, and rotational acceleration, respectively) may be provided by or derived from the movement training data. As further discussed above, the parameter I represents a moment of inertia, the parameter mg represents a weight of an arm segment (e.g., $3212_5$), the parameter r represents a distance between a CoM of the arm segment and a joint (e.g., $3214_4$) to which the arm segment is connected, the parameters represents an amount of static friction, and the parameter b represents a coefficient of viscous friction. In the above example, a may be an angle between a baseline position and a horizontal orientation, as illustrated in FIG. 3E. Further, the Sign($\dot{\theta}$) function may be used to represent the static friction having a direction which is opposite to a direction of motion. More particularly, the Sign($\dot{\theta}$) function may have a value of 1 when $\dot{\theta}$ is positive, a value of −1 when $\dot{\theta}$ is negative, and a value of 0 when $\dot{\theta}$ is 0.

In an embodiment, the computing system 1100 may be configured to use the above relationship to generate a set of equations corresponding to different points in time represented by the training data or, more generally, to different combinations of: (i) torque value from the actuation training data and (ii) position, velocity, or acceleration value from the movement training data. For instance, the computing system 1100 may be configured to generate the following set of equations, which may be represented as a matrix:

$$\begin{bmatrix} \tau_{train\_1} \\ \tau_{train\_2} \\ \vdots \\ \tau_{train\_n} \end{bmatrix} = \begin{bmatrix} [I\ddot{\theta}_{train\_1}] + [CoM*\sin(\theta_{train\_1}+\alpha)] + [s*\text{Sign}(\dot{\theta}_{train\_1})] + [b\dot{\theta}_{train\_1}] \\ [I\ddot{\theta}_{train\_2}] + [CoM*\sin(\theta_{train\_2}+\alpha)] + [s*\text{Sign}(\dot{\theta}_{train\_2})] + [b\dot{\theta}_{train\_2}] \\ \vdots \quad \vdots \quad \vdots \quad \vdots \quad \vdots \quad \vdots \quad \vdots \\ [I\ddot{\theta}_{train\_n}] + [CoM*\sin(\theta_{train\_n}+\alpha)] + [s*\text{Sign}(\dot{\theta}_{train\_n})] + [b\dot{\theta}_{train\_n}] \end{bmatrix} \quad (4)$$

In the above example, $\tau_{train\_1}$, $\tau_{train\_2}$, ... $\tau_{train\_n}$ may correspond to different torque values that are provided by or derived from the actuation training data. For example, if the actuation training data is from the example of FIG. 8A, then $\tau_{train\_1}$ may be equal $\tau(t_1)$, which is illustrated in FIG. 8A as being part of actuation training data, while $\tau_{train\_2}$ may be equal to $\tau(t_2)$, and $\tau_{train\_n}$ may be equal to $\tau(t_c)$. More specifically, if the actuation training data is from the example of FIG. 8A, then the torque values $\tau_{train\_1}$, $\tau_{train\_2}$, ... $\tau_{train\_n}$ in the above equation may more specifically include $\tau(t_1)$, $\tau(t_2)$, ... $\tau(t_a)$, and $\tau(t_{b+1})$ ... $\tau(t_c)$. Further, $\ddot{\theta}_{train\_1}$, $\ddot{\theta}_{train\_2}$, ... $\ddot{\theta}_{train\_n}$ may correspond to different acceleration values that are provided or derived from the movement training data, and which correspond to $\tau_{train\_1}$, $\tau_{train\_2}$, ... $\tau_{train\_n}$, respectively. Similarly, $\dot{\theta}_{train\_1}$, $\dot{\theta}_{train\_2}$, ... $\dot{\theta}_{train\_n}$ may correspond to different velocity values that are provided by or derived from the movement training data, while $\theta_{train\_1}$, $\theta_{train\_2}$, ... $\theta_{train\_n}$ may correspond to different position values that are provided by or derived from the movement training data. These values of position $\theta_{train\_1}$, $\theta_{train\_2}$, ... $\theta_{train\_n}$ or velocity $\dot{\theta}_{train\_1}$, $\dot{\theta}_{train\_2}$, ... $\dot{\theta}_{train\_n}$ may also correspond to the torque values of $\tau_{train\_1}$, $\tau_{train\_2}$, ... $\tau_{train\_n}$. In one example, the values of $\theta_{train\_1}$, $\theta_{train\_2}$, ... $\theta_{train\_n}$ in the above equation may more specifically include the rotational position values $\theta(t_1)$, $\theta(t_2)$, ... $\theta(t_a)$, and $\theta(t_{b+1})$. $\theta(t_c)$ of FIG. 8A. In the above example, the values in the above equation may correspond to different points in time, or more specifically to measurements made by one or more sensors (e.g., $3222_4$, $3224_4$) at different points in time.

In an embodiment, the computing system 1100 may be configured to solve the above set of simultaneous equations to determine respective estimated values for s, b, I, m, r, and/or α. Solving the equations may involve determining respective values for s, b, I, m, r, and/or α which satisfy or approximately satisfy the above equations. The friction parameter estimate may be, e.g., a value of s or a value of b determined from solving the equations. In some implementations, the computing system 1100 may be configured to apply a least squares fitting method to determine respective values for the above parameters which, e.g., minimize an amount of error between values on the left side of the equations (e.g., equations 4) and values on the right side of the equations. The values on the left side of the equation may be torque values $\tau_{train\_1}$, $\tau_{train\_2}$, ... $\tau_{train\_n}$ provided by or extracted from the actuation training data. The values on the right side of the equations may be calculated values using the above formula in, e.g., equation 4, and using rotational position values, rotational velocity values, and rotational acceleration values provided by or extracted from the movement training data.

Figure 10A:
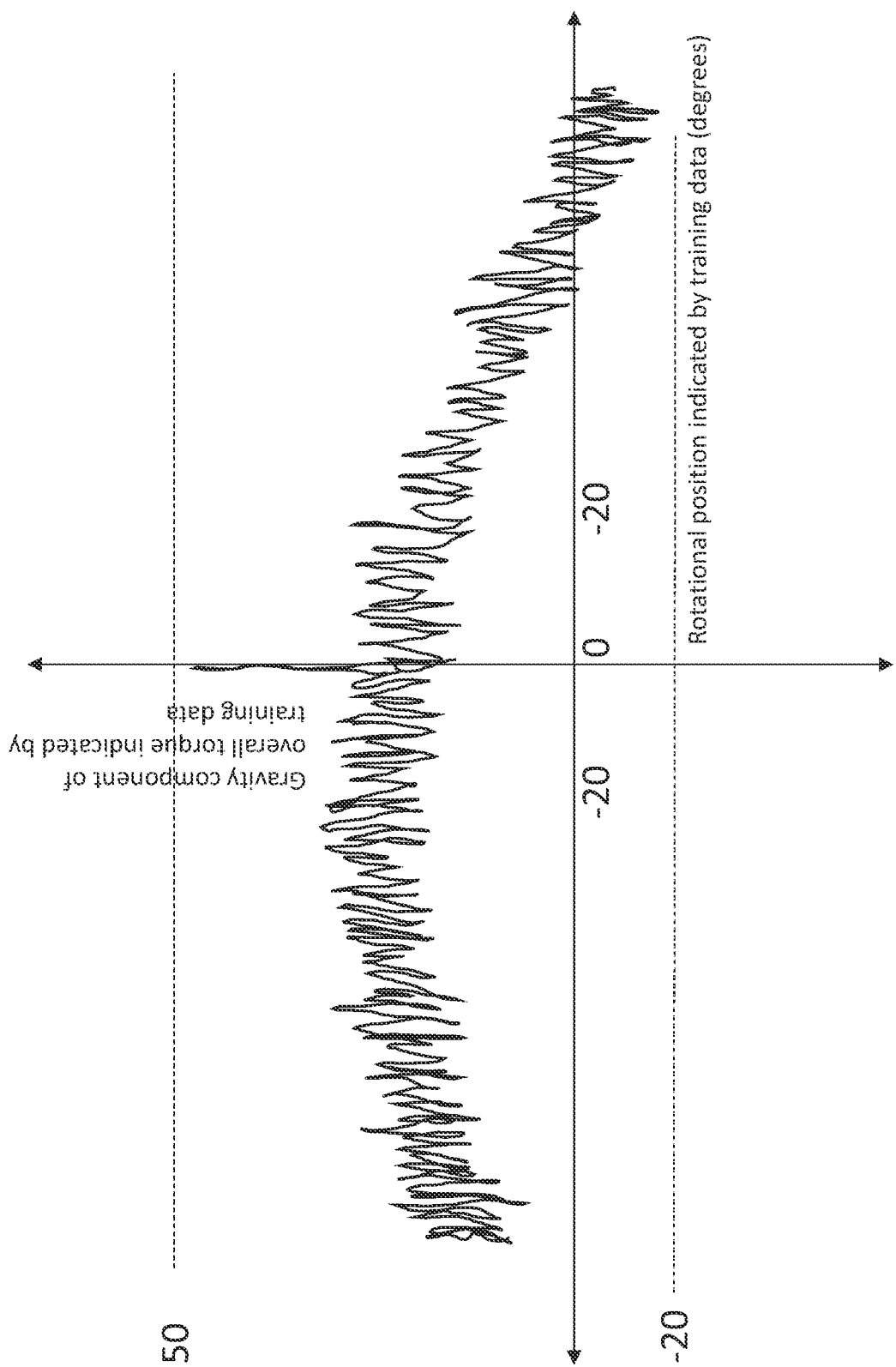
FIGS. 10A and 10B illustrate an example of determining a center of mass (CoM) estimate based on training data, consistent with an embodiment hereof.
Figure 10B:
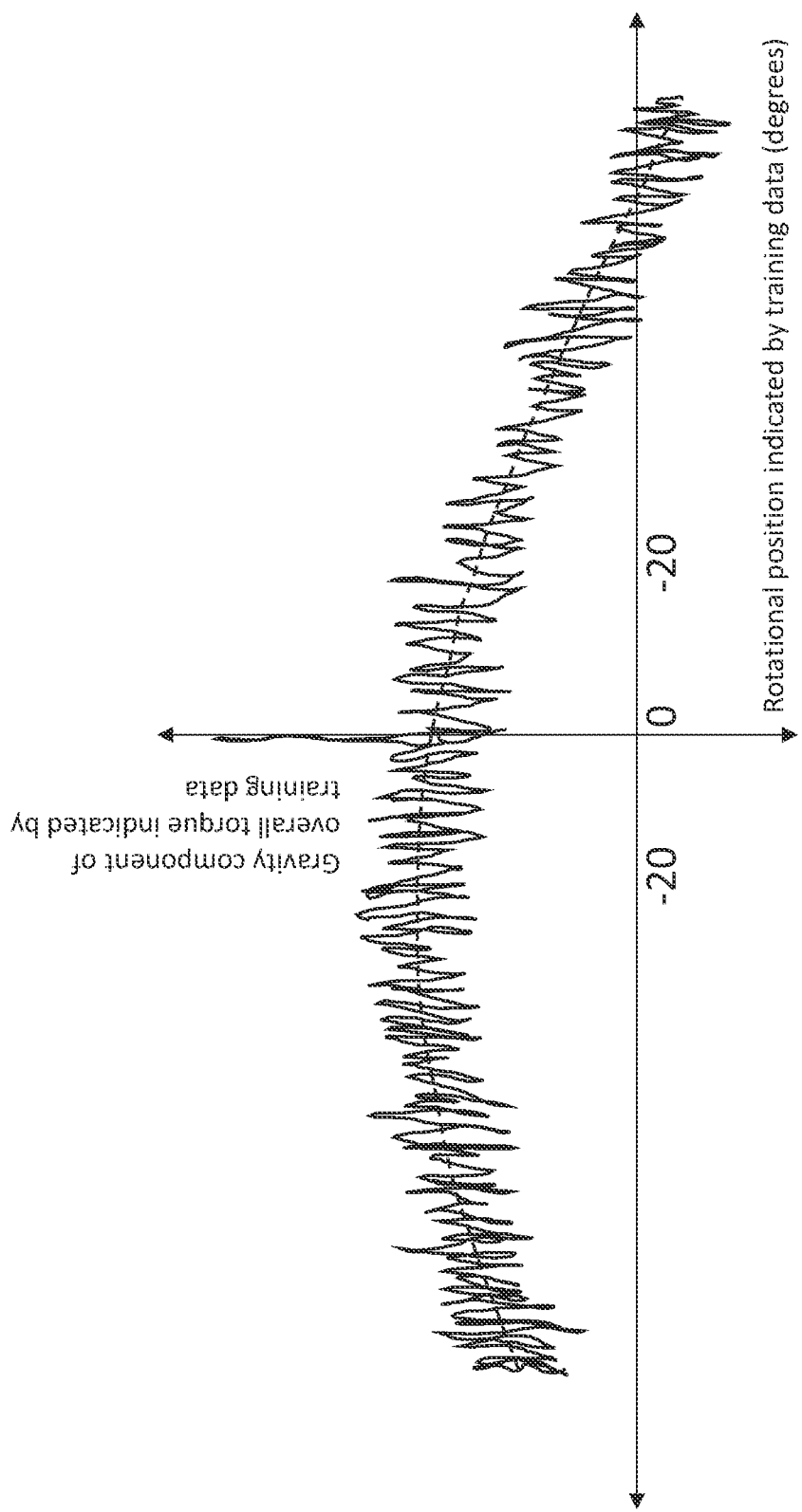

As stated above, step 4004 may involve determining at least one of a friction parameter estimate or a CoM estimate. In an embodiment, the computing system may determine the CoM estimate by solving the multiple simultaneous equations illustrated above. In some instances, the computing system 1100 may use the above technique or some other technique to effectively extract, from the actuation training data, a component of the overall torque that is due to a weight of an arm segment (e.g., $3212_5$), or more specifically due to an effect of gravity on a CoM of the arm segment. In one example, this component may be expressed as mgr cos ($\theta+\alpha$), and may be obtained by, e.g., subtracting, from the overall torque, a contribution of the actuator (e.g., $I\ddot{\theta}$) and a contribution of friction (e.g., s+b$\dot{\theta}$). For example, FIG. 10A provides an example of values which represent a gravity component of overall torque, which may be approximated as an effect of gravity on the CoM of an arm segment. FIG. 10B illustrates a sinusoidal fit, or more specifically a sinusoidal curve which the computing system 1100 is using to fit the values in FIG. 10A. In some instances, the computing system 1100 may determine the CoM estimate based on an amplitude and phase shift of the sinusoidal curve of FIG. 10B. More particularly, the computing system 1100 may be configured to determine a value of mgr based on an amplitude of the sinusoidal curve, while the parameter a may affect a phase shift of the sinusoidal curve. In this example, the computing system 1100 may determine a ratio between the amplitude of the sinusoidal curve and the weight of the arm segment, wherein the ratio may be equal to or indicate r, which may represent the CoM of the arm segment.

In an embodiment, when determining an estimate of CoM for a particular arm segment based on the actuation training data, the computing system 1100 may be configured to take into account an influence that downstream arm segments (e.g., more distal arm segments) may have on the actuation training data or other training data. More particularly, a weight from a downstream arm segment (e.g., 3212₆) may contribute to the overall torque at the particular arm segment (e.g., 3212₅) or a joint (e.g., 3214₄). Thus, the downstream arm segment may influence actuation training data or movement training data used to determine the CoM estimate for the particular arm segment (e.g., 3212₅). In such a situation, the computing system 1100 may determine how much the actuation training data or movement training data is influenced by the weight of the downstream arm segment, so as to remove or compensate for that influence.

In some instances, step 4004 may include determining an estimate for a moment of inertia I, such as by solving the equations (e.g., equations 4) discussed above. Determining a CoM estimate, a friction parameter estimate, and/or an estimate of the moment of inertia is discussed in more detail in U.S. patent application Ser. No. 17/243,939 (MJ0062-US/0077-0015US1), entitled METHOD AND COMPUTING SYSTEM FOR ESTIMATING PARAMETER FOR ROBOT OPERATION, the entire content of which is incorporated by reference herein.

Referring back to FIG. 4, the embodiment 4000 may in an embodiment include a step 4006, in which the computing system 1100 determines actuation prediction data based on the movement test data, such as $\theta_{test}$ of FIG. 8A, and based on the at least one of: (i) the friction parameter estimate or (ii) the CoM estimate, wherein the estimate is determined from step 4004. For example, the actuation prediction data may be a set $\tau_{predict}$ that predict torque values (which may also be referred to as torque prediction values), or may be a set $f_{predict}$ that predict force values (which may also be referred to as force prediction values), wherein the prediction values for torque or force may be a prediction which is indicative of overall torque or overall force at a joint associated with the rotation or other motion used to generated the sensor data, such as, such as 3214₄. In this example, the set $\tau_{predict}$ may predict a plurality of torque values, such as $\tau_{predict\_1}$, $\tau_{predict\_2}$, ... $\tau_{predict\_n}$. In other words, the set $\tau_{predict}$ may include a plurality of torque prediction values (also referred to as predicted torque values) $\tau_{predict\_1}$, $\tau_{predict\_2}$, ... $\tau_{predict\_n}$.

Figure 11:
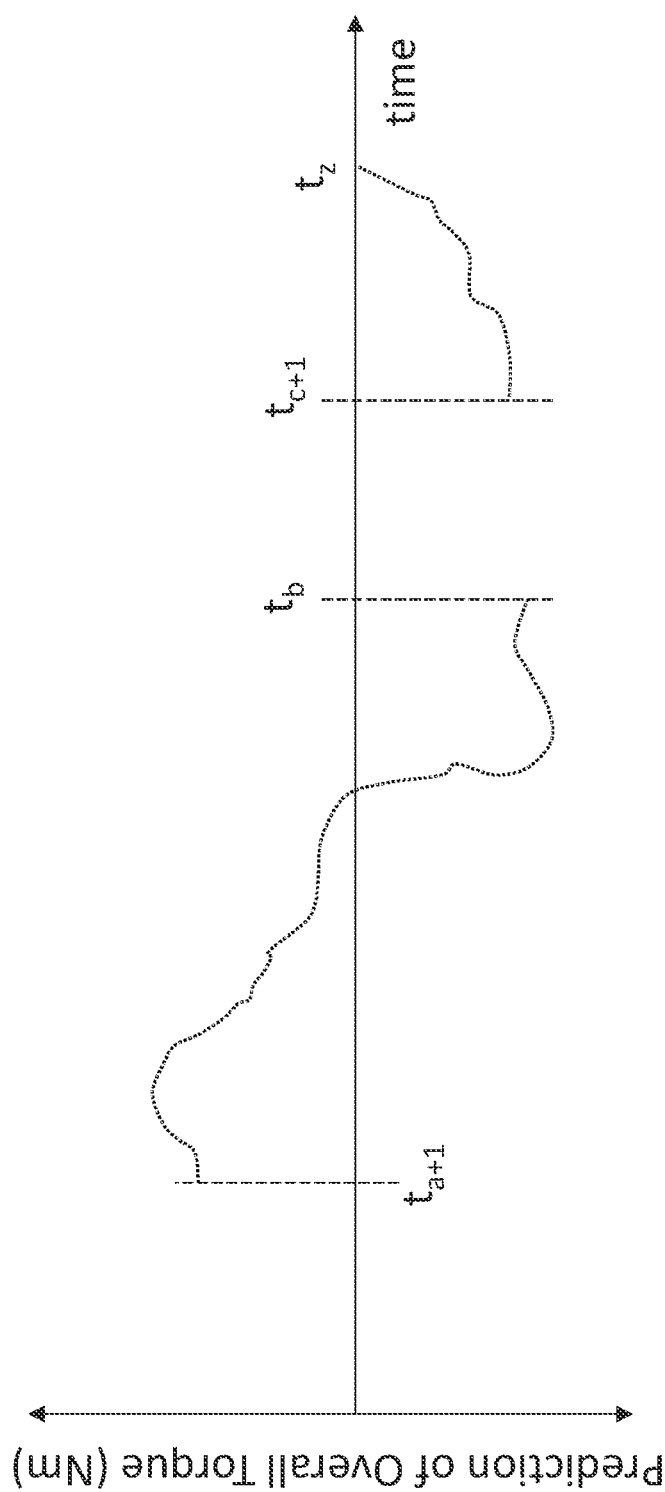
FIG. 11 illustrates an example of actuation prediction data generated based on movement test data, consistent with an embodiment hereof.

In some instances, the torque prediction values or other actuation prediction data may correspond to different points in time during a time period in which the sensor data was generated. For instance, FIG. 11 provides a graph which represents actuation prediction data that includes a plurality of torque prediction values $\tau_{predict\_1}$, $\tau_{predict\_2}$, ... $\tau_{predict\_n}$ that correspond to different points in time. More particularly, the torque prediction values and the movement test data used to generate the torque prediction values may correspond to different points in time. For instance, the movement test data $\theta_{test}$ may include a plurality of rotational position values $\theta_{test\_1}$, $\theta_{test\_2}$, ... $\tau_{test\_n}$. If the movement test data is from the example of FIG. 8A, then the rotational position values $\theta_{test\_1}$, $\theta_{test\_2}$, ... $\theta_{test\_n}$ of the movement test data may more specifically include the rotational position values $\theta(t_{a+1})$ ... $\theta(t_b)$ and $\theta(t_{c+1})$ ... $\theta(t_z)$ of FIG. 8A. In such an example, the movement test data may correspond to the points in time of $t_{a+1}$ ... $t_b$ and $t_{c+1}$ ... $t_z$. The actuation prediction data may be based on the movement test data, and thus may also correspond to the points in time of $t_{a+1}$ ... $t_b$ and $t_{c+1}$ ... $t_z$.

In an embodiment, the actuation prediction data may be determined based on an equation similar to equations 2, 3, or 4 above. For instance, if the actuation prediction data includes a plurality of torque prediction values $\tau_{predict\_1}$, $\tau_{predict\_2}$, ... $\tau_{predict\_n}$, then each torque prediction value $\tau_{predict\_i}$ in the set may be determined based on the equation:

$$\tau_{predict\_i} = I\ddot{\theta}_{test\_i} + [CoM^* \sin(\theta_{test\_i} + \alpha)] + [s^* \text{Sign}(\dot{\theta}_{test\_i})] + [b\dot{\theta}_{test\_i}] \text{ or} \quad (5)$$

$$\tau_{predict\_i} = I\ddot{\theta}_{test\_i} + [CoM^* \cos(\theta_{test\_i} + \alpha)] + [s^* \text{Sign}(\dot{\theta}_{test\_i})] + [b\dot{\theta}_{test\_i}] \quad (6)$$

In this equation, $\ddot{\theta}_{test\_i}$, $\dot{\theta}_{test\_i}$, $\theta_{test\_i}$ refer to an in, rotational acceleration value, rotational velocity value, or rotational position value provided by or derived from the movement test data, such as the movement test data $\theta_{test}$ of FIG. 8A. The values of s and b in the equation may be respective estimates of coulomb friction and dynamic friction, which may be determined as part of the friction parameter estimate, while the value of CoM may be a CoM estimate, and the value of I may be an estimate of the moment of inertia. Some or all of these estimates may be determined in step 4004 based on the movement training data and the actuation training data, as discussed above.

Figure 12:
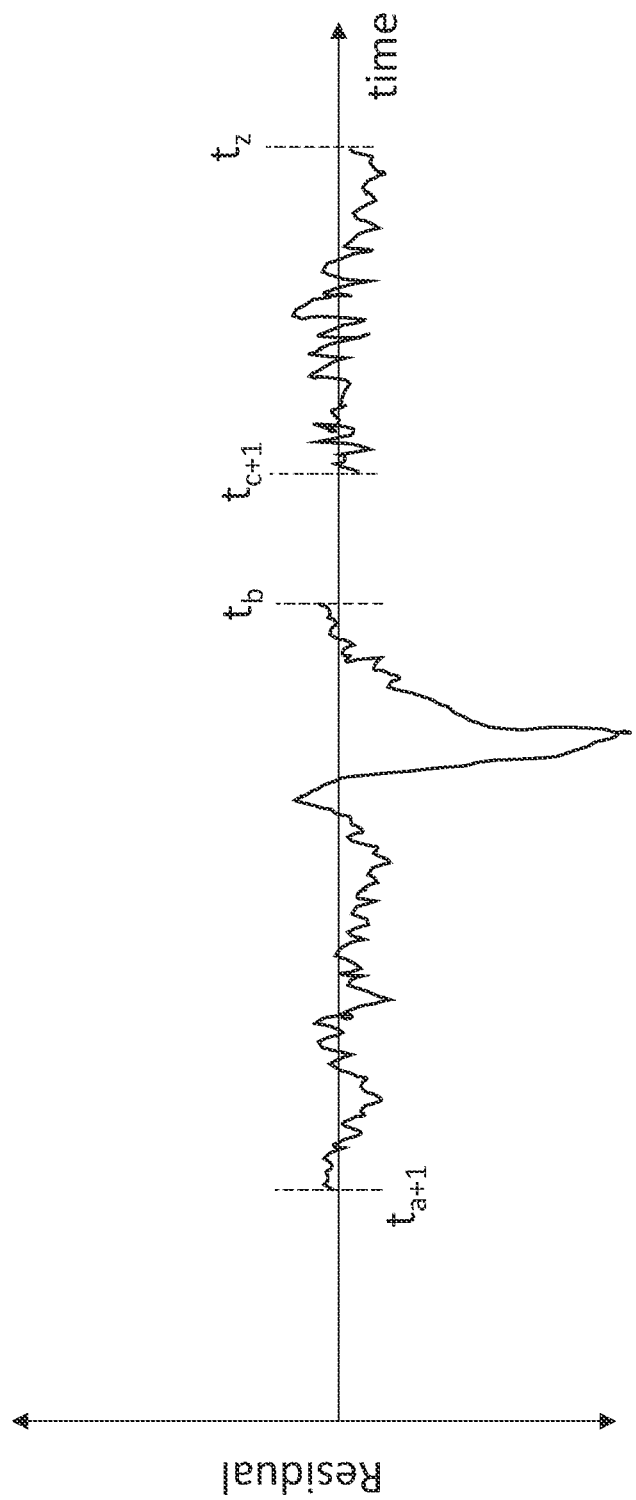
FIG. 12 illustrates an example of residual data values, consistent with an embodiment hereof.

Returning to FIG. 4, the method 4000 may in an embodiment include a step 4008, in which the computing system 1100 determines residual data, which may describe deviation or error between the actuation prediction data, such as $\tau_{predict}$ discussed above, and the actuation test data, such as $\tau_{test}$ of FIG. 8A. In some instances, as illustrated in FIG. 12, the residual data may include residual data values that correspond to different points in time. For example, if $\tau_{predict}$ is based on the movement test data of FIG. 8A, the actuation prediction data may include torque prediction values that correspond to the points in time of $t_{a+1}$ ... $t_b$ and $t_{c+1}$ ... $t_z$. In this example, the actuation test data $\tau_{test}$ may include values $\tau_{test\_1}$, $\tau_{test\_2}$, ... $\tau_{test\_n}$ that also correspond to the points in time of $t_{a+1}$ ... $t_b$ and $t_{c+1}$ ... $t_z$.

In an embodiment, the residual data may indicate how much error there is between the actuation prediction data and the actuation test data. In such an embodiment, the computing system 1100 may determine the residual data by determining a difference between actuation prediction data and actuation test data. If the actuation prediction data includes a plurality of torque prediction values, and if the actuation test data also includes a plurality of torque values, the computing system 1100 may determine the residual data by subtracting the plurality of torque prediction values from the plurality of torque values of the actuation test data, or vice versa. For instance, FIG. 13A depicts an example in which the residual data includes residual data values $e_1$, $e_2$, $e_3$, ... $e_n$, which may indicate error between torque prediction values and torque values of the actuation test data. In this example, the computing system 1100 may determine the residual data values $e_1$, $e_2$, $e_3$, ... $e_n$ by, e.g., subtracting the torque values $\tau_{test\_1}$, $\tau_{test\_2}$ ... $\tau_{test\_n}$ of the actuation test data by the torque prediction values $\tau_{predict\_1}$, $\tau_{predict\_2}$, ... $\tau_{predict\_n}$ of the actuation prediction data.

Returning to FIG. 4, the method 4000 may in an embodiment include a step 4010, in which the computing system 1100 determines a value for an error parameter which describes the residual data values, such as the values $e_1$, $e_2$, $e_3$, ... $e_n$ in FIG. 13A. In some instances, the error parameter may indicate quality of the sensor data generated for robot calibration. In some instances, the error parameter may indicate, e.g., a quality, accuracy, or reliability of a model that describes a relationship between (i) overall torque or overall force and (ii) friction or CoM. In some instances, the error parameter may indicate an accuracy or reliability of the estimated values (e.g., friction parameter estimate, CoM estimate, and/or estimate of moment of inertia) that are determined using the model. In other words, the error parameter may indicate a level of confidence (or a lack of confidence) in the model, the sensor data, and/or the parameter estimates.

In an embodiment, the model may have been used by the computing system 1100 to determine the friction parameter estimate and/or CoM estimate in step 4004, and/or to calculate the actuation prediction data in step 4006. The model may, e.g., describe the relationship between (i) overall torque or overall force at a joint (e.g., $3214_4$) or arm segment (e.g., $3212_5$) and (ii) friction between arm segments (e.g., $3212_5$, $3212_4$) connected by that joint or CoM of one of the arm segments (e.g., $3212_5$). The model may include or may be represented by an equation, such as one of equations 2, 3, 4, 5, or 6. The equation may, e.g., define overall force or overall torque as a function of parameters such as coefficient b of viscous friction and the static friction s between the arm segments, CoM of one of the arm segments, moment of inertia I of one of the arm segments, and as a function of movement data values, such as rotational position values, rotational velocity values, and/or rotational acceleration values. In some scenarios, the equation or equations in the model may provide a simplified approximation of how friction, gravity, or force or torque from an actuator affect overall force or torque at the joint or arm segment. Because the model may provide only an approximation of the relationship between overall force or torque and parameters such as friction, CoM, and torque or force output by an actuator, the actuation prediction data what is based on this model may not completely match the actuation test data. Because the error parameter may describe how much deviation there is between the actuation test data and the actuation prediction data, the error parameter may be indicative of a level of accuracy of the model used to generate the actuation prediction data, or more specifically of the equation(s) in the model, and whether the model is sufficiently accurate or whether the model may be too simplistic. In some instances, the error parameter may further indicate a level of accuracy of the estimated values which are inputs to the equation, such as the friction parameter estimate and the CoM estimate.

As stated above, the error parameter may in an embodiment be indicative of a quality of sensor data which was used to estimate friction, CoM, and/or moment of inertia in step 4004, or more generally of sensor data used to perform robot calibration. For instance, the sensor data may measure movement of one or more arm segments of a robot, such as arm segment $3212_5$ of the robot 3200. In some instances, the arm segment (e.g., $3212_5$) or other portion of the robot may experience an event, such as the robot bumping or colliding with another object, which may unexpectedly impede or alter its movement. Such a collision may lead to uneven movement of one or more arm segments of the robot, including movement featuring sudden changes in acceleration, rather than smooth movement. The uneven movement may yield sensor data, including actuation data and movement data, that is not particularly reliable for robot calibration and thus low in quality.

In an embodiment, the quality of the sensor data may be reflected through a frequency content in the residual data values of step 4010. More particularly, the error parameter in this embodiment may describe or be indicative of frequency content in the residual data values. In some instances, the presence of low frequency content may indicate or may be consistent with sensor data having low or unreliable quality, such as sensor data that is generated when the robot (e.g., 3200) experienced a collision with another object. More particularly, the presence of high frequency content in the residual data values may be associated or consistent with, e.g., background noise such as electrical noise which may randomly fluctuate and introduce random amounts of change into movement data or actuation data being generated by a sensor. In some scenarios, the background noise may be a relatively small source of error compared to an event such as the robot colliding with another object. In some situations, an event such as a collision may also introduce change into the movement data or actuation data, but a frequency of that change may be low compared to a frequency of the background noise. Thus, the presence of low frequency content in the residual data values may be more consistent with an event, such as collision between the robot and another object, which may degrade quality of the movement data, actuation data, or other sensor data used for robot calibration.

Figure 13B:
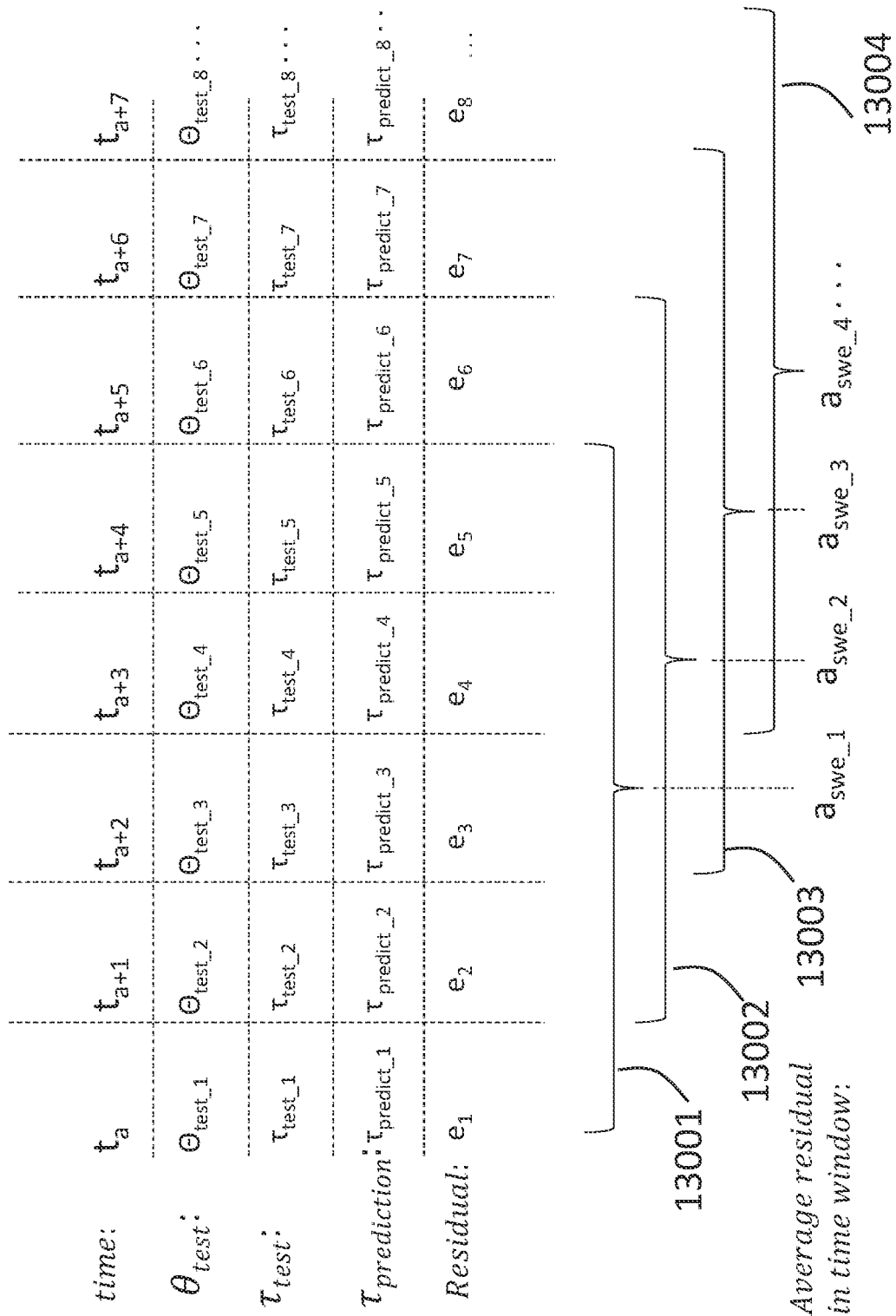
FIG. 13B illustrates an example of determining average values for respective groups of residual data values in respective time windows, consistent with an embodiment hereof.

In an embodiment, the computing system 1100 may perform an averaging function on a group of residual data values. The averaging function may have an effect of performing frequency filtering on the group of residual data values. For example, the averaging function may yield a result which weighs low frequency content more heavily than high frequency content, or vice versa. In some instances, the result of the averaging function may have a higher value when there is more low frequency content. Thus, a result of the averaging function may be indicative of frequency content in the group of residual data values. In some implementations, the group of residual data values may be residual data values corresponding to a time window. For instance, the computing system 1100 may determine a plurality of average residual data values for a plurality of respective time windows. As an example, FIG. 13B illustrates a plurality of time windows 13001, 13002, 13003, 13004, which are time windows (also referred to as time slots) in a time period during which the actuation test data, movement test data, or other sensor data are generated for robot calibration. These time windows (e.g., 5 msec, 10 msec, or 100 msec time windows) may correspond to different respective subsets of the residual data values. In this example, the time window 13001 may cover a time range from $t_a$ to $t_{a+4}$, and may correspond to a first subset of residual data values $e_1$ through $e_5$. The time window 13002 may cover a time range from $t_{a+1}$ to $t_{a+5}$, and may correspond to a second subset of residual data values $e_2$ through $e_6$. As another example, the time window 13003 may cover a time range from $t_{a+2}$ to $t_{a+6}$, and may correspond to a third subset of residual data values $e_3$ through $e_7$.

In an embodiment, the time windows (e.g., 13001-13004) may be sliding time windows. More specifically, they may represent overlapping time periods or time ranges, and have respective start times spaced apart by a defined sliding time increment (e.g., 1 msec, 5 msec, etc.). In the example of FIG. 13B, the respective start times of the time windows 13001-13004 may be spaced apart by a defined sliding time increment (e.g., predefined increment) equal to $t_{a+1}$ minus $t_a$. While FIG. 13B depicts time windows which each have 5 residual data values, other examples may have time windows that contain more residual data values (e.g., 20 residual data values, 100 residual data values), or fewer residual data values.

In an embodiment, the computing system 1100 may perform the averaging function by determining a plurality of average residual data values for a plurality of respective time windows. For instance, in the example of FIG. 13B, the plurality of average residual data values (also referred to as an array of residual data values) may be $a_{swe\_1}$, $a_{swe\_2}$, $a_{swe\_3}$, $a_{swe\_4}$, . . . . Each of the average residual data values may be an average of residual data values in a corresponding sliding time window. For example, the average residual data value $a_{swe\_1}$ may be an average of residual data values $e_1$, $e_2$, $e_3$, $e_4$, and $e_5$ in the time window 13001. As another example, the average residual data value $a_{swe\_2}$ may be an average of residual data values $e_2$, $e_3$, $e_4$, $e_5$, and $e_6$ in the time window 13002. As stated above, the plurality of average residual data values may be affected by frequency content within residual data values contained by their corresponding time windows. Thus, the plurality of average residual data values may be indicative of frequency content within a respective group of residual data values belonging to a respective time window. As also stated above, low frequency content in the residual data values may be indicative of or consistent with the sensor data being unreliable or having a low quality. Thus, the computing system 1100 may determine whether the sensor data involved in robot calibration has sufficient quality based on the average residual data values.

In an embodiment, the computing system 1100 may determine the value of the error parameter based on the plurality of average residual data values. As an example, the computing system 1100 may determine the value of the error parameter to be equal to or based on a maximum, or $M_{aswe}$, of the plurality of average residual data values, such as $a_{swe\_1}$, $a_{swe\_2}$, $a_{swe\_3}$, $a_{swe\_4}$, . . . . As stated above, the value of the error parameter in this example, such as $M_{aswe}$, may be indicative of how much low frequency content or how much high frequency content is in the residual data values, which may be indicative of a quality or reliability of sensor data generated for robot calibration. In some instances, a relatively low value for the error parameter, such as $M_{aswe}$, may indicate that the residual data values are near zero, and that quality of the sensor data is relatively high, while a relatively high value for the error parameter may indicate that quality of the sensor data is relatively low.

In an embodiment, the computing system 1100 may determine whether the value of the error parameter exceeds a defined error threshold (e.g., predefined error threshold) or is below a defined confidence threshold (e.g., predefined confidence threshold). In some instances, the confidence threshold may be, e.g., an inverse of the error threshold. If the value of the error parameter exceeds the defined error threshold or is below the defined confidence threshold, the computing system 1100 may output an indication that the value of the error parameter exceeds the error threshold or is below the confidence threshold. In some implementations, the indication may be a signal that is outputted via the communication interface 1130, wherein the signal may be received by another computing system. In some implementations, the indication may be a text or graphical message that is output on a display device (if any) of the computing system 1100. In some instances, the computing system 1100 may store the value of the error parameter in the non-transitory computer-readable medium 1120.

In an embodiment, the defined error threshold may be, e.g., a manually defined value which the computing system 1100 receives and stores in the non-transitory computer-readable medium 1120. In an embodiment, the defined error threshold may be a value that the computing system 1100 has dynamically defined or otherwise determined. For example, the computing system 1100 may determine the error threshold based on a defined torque value (e.g., a nominal torque value), a defined speed multiplier (e.g., predefined speed multiplier) associated with a particular robot, and an experimentally determined percentage value which may also be associated with the particular robot (e.g., 3200). Thus, different robots may be associated with different error thresholds in this example.

In an embodiment, if the value of the error parameter exceeds the defined error threshold or is less than the defined confidence threshold, such an indication may be used by the computing system 1100, by another computing system, and/or by a user to determine whether to re-perform robot calibration, whether to alter a model used to perform robot calibration, and/or whether to change how motion planning for the robot (e.g., 3200) or robot arm (e.g., 3210) is performed. For example, the robot calibration may be re-performed in an attempt to obtain new sensor data and generate new estimates for the friction parameter and/or CoM estimate. The computing system 1100 may then repeat steps of method 4000 to determine whether the new sensor data or new estimates lead to a better value for the error parameter.

ADDITIONAL DISCUSSION OF VARIOUS EMBODIMENTS

Embodiment 1 relates to a computing system, a method performed by the computing system, or a non-transitory computer-readable medium having instructions for performing the method. In this embodiment, the computing system includes the non-transitory computer-readable medium and at least one processing circuit. The at least one processing circuit is configured to perform various operations when the non-transitory computer-readable medium is storing sensor data which includes: (i) a set of movement data indicative of an amount or rate of relative movement between a pair of immediately adjacent arm segments of a robot arm that is occurring or has occurred via a joint of the robot arm, and (ii) a set of actuation data indicative of overall torque or overall force at the joint in a time period during which the relative movement is occurring or has occurred. The various operations may include the following: dividing the sensor data into training data and test data by: (i) selecting, as the training data, movement training data and corresponding actuation training data, wherein the movement training data is a first subset of the set of movement data, and wherein the actuation training data is a first subset of the set of actuation data, and (ii) selecting, as the test data, movement test data and corresponding actuation test data, wherein the movement test data is a second subset of the set of movement data, and wherein the actuation test data is a second subset of the set of actuation data. The various operations may further include determining, based on the movement training data and the actuation training data, at least one of: (i) a friction parameter estimate associated with friction between the pair of immediately adjacent arm segments, or (ii) a center of mass (CoM) estimate associated with one of the pair of immediately adjacent arm segments. The various operations may further include determining actuation prediction data based on the movement test data and based on the at least one of: (i) the friction parameter estimate or (ii) the CoM estimate, wherein the actuation prediction data is a prediction which is indicative of overall torque or overall force at the joint at different points in time. The various operations may further include determining residual data, which includes residual data values describing deviation between the actuation prediction data and the actuation test data corresponding to the different points in time, respectively; determining, based on the residual data, a value for an error parameter which describes the residual data values; determining whether the value of the error parameter exceeds a defined error threshold; and outputting an indication of whether the value of the error parameter exceeds the defined error threshold.

Embodiment 2 includes the computing system of embodiment 1, wherein the error parameter is indicative of frequency content in the residual data values.

Embodiment 3 includes the computing system of embodiment 1 or 2, wherein the error parameter indicates quality of the sensor data.

Embodiment 4 includes the computing system of any one of embodiments 1-3, wherein the error parameter indicates accuracy of a model which describes a relationship between (i) overall torque or overall force and (ii) friction or CoM.

Embodiment 5 includes the computing system of any one of embodiments 1-4, wherein the at least one processing circuit is configured to determine a plurality of average residual data values for a plurality of respective time windows in the time period, wherein the plurality of respective time windows correspond to different respective subsets of the residual data values. In this embodiment, the value of the error parameter is determined based on the plurality of average residual data values.

Embodiment 6 includes the computing system of embodiment 5, wherein the at least one processing circuit is configured to determine the value of the error parameter based on a maximum of the plurality of average residual data values.

Embodiment 7 includes the computing system of embodiment 5 or 6, wherein the plurality of time windows represent overlapping time periods with respective start times spaced apart by a defined sliding time increment.

Embodiment 8 includes the computing system of any one of embodiments 1-7, wherein the set of movement data includes a plurality of movement data values corresponding to different points in time, wherein the at least one processing circuit is configured to divide the sensor data into training data and test data by performing the following for each movement data value of the plurality of movement data values: determining a respective position value that is equal to or based on the movement data value, wherein the respective position value describes position of a first arm segment of the pair of immediately adjacent arm segments relative to a second arm segment of the pair of immediately adjacent arm segments at a respective point in time corresponding to the movement data value; determining a respective velocity value that is equal to or based on the movement data value, wherein the respective velocity value describes velocity of the first arm segment relative to the second arm segment at the respective point in time; and determining whether to select the movement data value as training data or as test data based on a respective ratio between the respective velocity value and the respective position value.

Embodiment 9 includes the computing system of embodiment 8, wherein the at least one processing circuit is configured, for each movement data value of the plurality of movement data values, to determine whether to select the movement data value as training data or as test data based on whether the respective ratio between the respective velocity value and the respective position value associated with the movement data value is at least one of the following: (i) within a range of ratios that extend from 0 to a defined positive ratio threshold, or (ii) less than a defined negative ratio threshold.

Embodiment 10 includes the computing system of embodiment 8 or 9, wherein the at least one processing circuit is configured, for each movement data value of the plurality of movement data values, to determine whether to select the movement data value as training data or as test data based on whether the respective ratio between the respective velocity value and the respective position value associated with the movement data value is at least one of the following: (i) within a range of ratios that extend from 0 to a defined negative ratio threshold, or (ii) greater than a defined positive ratio threshold.

Embodiment 11 includes the computing system of any one of embodiments 1-10, wherein the friction parameter estimate is an estimate of a coefficient of viscous friction, or is an estimate of coulomb friction.

Embodiment 12 includes the computing system of any one of embodiments 1-11, wherein the at least one processing circuit is configured, when the set of actuation data measures electrical current flowing through an actuator for causing the relative movement between the pair of immediately adjacent arm segments, to determine the overall torque or the overall force at the joint based on the electrical current.

It will be apparent to one of ordinary skill in the relevant arts that other suitable modifications and adaptations to the methods and applications described herein may be made without departing from the scope of any of the embodiments. The embodiments described above are illustrative examples and it should not be construed that the present invention is limited to these particular embodiments. It should be understood that various embodiments disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the methods or processes). In addition, while certain features of embodiments hereof are described as being performed by a single component, module, or unit for purposes of clarity, it should be understood that the features and functions described herein may be performed by any combination of components, units, or modules. Thus, various changes and modifications may be affected by one skilled in the art without departing from the spirit or scope of the invention as defined in the appended claims.

The invention claimed is:

1. A computing system comprising:
    a non-transitory computer-readable medium;
    at least one processing circuit configured to perform the following when the non-transitory computer-readable medium is storing sensor data which includes: (i) a set of movement data indicative of an amount or rate of relative movement between a pair of immediately adjacent arm segments of a robot arm that is occurring or has occurred via a joint of the robot arm, and (ii) a set of actuation data indicative of overall torque or overall force at the joint in a time period during which the relative movement is occurring or has occurred:

dividing the sensor data into training data and test data by: (i) selecting, as the training data, movement training data and corresponding actuation training data, wherein the movement training data is a first subset of the set of movement data, and wherein the actuation training data is a first subset of the set of actuation data, and (ii) selecting, as the test data, movement test data and corresponding actuation test data, wherein the movement test data is a second subset of the set of movement data, and wherein the actuation test data is a second subset of the set of actuation data;

determining, based on the movement training data and the actuation training data, at least one of: (i) a friction parameter estimate associated with friction between the pair of immediately adjacent arm segments, or (ii) a center of mass (CoM) estimate associated with one of the pair of immediately adjacent arm segments;

determining actuation prediction data based on the movement test data and based on the at least one of: (i) the friction parameter estimate or (ii) the CoM estimate, wherein the actuation prediction data is a prediction which is indicative of the overall torque or overall force at the joint at different points in time;

determining residual data, which includes residual data values describing deviation between the actuation prediction data and the actuation test data corresponding to the different points in time, respectively;

determining, based on the residual data, a value for an error parameter which describes the residual data values;

determining whether the value of the error parameter exceeds a defined error threshold; and outputting an indication of whether the value of the error parameter exceeds the defined error threshold.

2. The computing system of claim 1, wherein the error parameter is indicative of frequency content in the residual data values.

3. The computing system of claim 2, wherein the error parameter indicates quality of the sensor data.

4. The computing system of claim 2, wherein the error parameter indicates accuracy of a model which describes a relationship between (i) overall torque or overall force and (ii) friction or CoM.

5. The computing system of claim 1, wherein the at least one processing circuit is configured to determine a plurality of average residual data values for a plurality of respective time windows in the time period, wherein the plurality of respective time windows correspond to different respective subsets of the residual data values, wherein the value of the error parameter is determined based on the plurality of average residual data values.

6. The computing system of claim 5, wherein the at least one processing circuit is configured to determine the value of the error parameter based on a maximum of the plurality of average residual data values.

7. The computing system of claim 5, wherein the plurality of respective time windows represent overlapping time periods with respective start times spaced apart by a defined sliding time increment.

8. The computing system of claim 1, wherein the set of movement data includes a plurality of movement data values corresponding to different points in time, wherein the at least one processing circuit is configured to divide the sensor data into the training data and the test data by performing the following for each movement data value of the plurality of movement data values:

determining a respective position value that is equal to or based on the movement data value, wherein the respective position value describes position of a first arm segment of the pair of immediately adjacent arm segments relative to a second arm segment of the pair of immediately adjacent arm segments at a respective point in time corresponding to the movement data value;

determining a respective velocity value that is equal to or based on the movement data value, wherein the respective velocity value describes velocity of the first arm segment relative to the second arm segment at the respective point in time; and determining whether to select the movement data value as the training data or as the test data based on a respective ratio between the respective velocity value and the respective position value.

9. The computing system of claim 8, wherein the at least one processing circuit is configured, for each movement data value of the plurality of movement data values, to determine whether to select the movement data value as the training data or as the test data based on whether the respective ratio between the respective velocity value and the respective position value associated with the movement data value is at least one of the following: (i) within a range of ratios that extend from 0 to a defined positive ratio threshold, or (ii) less than a defined negative ratio threshold.

10. The computing system of claim 8, wherein the at least one processing circuit is configured, for each movement data value of the plurality of movement data values, to determine whether to select the movement data value as the training data or as the test data based on whether the respective ratio between the respective velocity value and the respective position value associated with the movement data value is at least one of the following: (i) within a range of ratios that extend from 0 to a defined negative ratio threshold, or (ii) greater than a defined positive ratio threshold.

11. The computing system of claim 1, wherein the friction parameter estimate is an estimate of a coefficient of viscous friction, or is an estimate of coulomb friction.

12. The computing system of claim 1, wherein the at least one processing circuit is configured, when the set of actuation data measures electrical current flowing through an actuator for causing the relative movement between the pair of immediately adjacent arm segments, to determine the overall torque or the overall force at the joint based on the electrical current.

13. A non-transitory computer-readable medium having instructions thereon that, when executed by at least one processing circuit of a computing system, causes the at least one processing circuit to perform the following:

dividing sensor data stored on the non-transitory computer-readable medium into training data and test data, wherein the sensor data which the non-transitory computer-readable medium is configured to store includes: (i) a set of movement data indicative of an amount or rate of relative movement between a pair of immediately adjacent arm segments of a robot arm that is occurring or has occurred via a joint of the robot arm, and (ii) a set of actuation data indicative of overall torque or overall force at the joint in a time period during which the relative movement is occurring or has occurred,
    wherein the sensor data is divided into the training data and the test data by: (i) selecting, as the training data, movement training data and corresponding actuation training data, wherein the movement training data is a first subset of the set of movement data, and wherein the actuation training data is a first subset of the set of actuation data, and (ii) selecting, as the test data, movement test data and corresponding actuation test data, wherein the movement test data is a second subset of the set of movement data, and wherein the actuation test data is a second subset of the set of actuation data,
wherein the instructions, when executed by the at least one processing circuit, further cause the at least one processing circuit to perform the following:
determining, based on the movement training data and the actuation training data, at least one of: (i) a friction parameter estimate associated with friction between the pair of immediately adjacent arm segments, or (ii) a center of mass (CoM) estimate associated with one of the pair of immediately adjacent arm segments, and wherein the instructions cause the at least one processing circuit to further perform the following:
determining actuation prediction data based on the movement test data and based on the at least one of: (i) the friction parameter estimate or (ii) the CoM estimate, wherein the actuation prediction data is a prediction which is indicative of the overall torque or overall force at the joint at different points in time;
determining residual data, which includes residual data values describing deviation between the actuation prediction data and the actuation test data corresponding to the different points in time, respectively;
determining, based on the residual data, a value for an error parameter which describes the residual data values;
determining whether the value of the error parameter exceeds a defined error threshold; and
outputting an indication of whether the value of the error parameter exceeds the defined error threshold.

14. The non-transitory computer-readable medium of claim 13, wherein the error parameter is indicative of frequency content in the residual data values.

15. The non-transitory computer-readable medium of claim 14, wherein the error parameter indicates quality of the sensor data.

16. The non-transitory computer-readable medium of claim 14, wherein the error parameter indicates accuracy of a model which describes a relationship between (i) overall torque or overall force and (ii) friction or CoM.

17. The non-transitory computer-readable medium of claim 13, wherein the instructions further cause the at least one processing circuit to determine a plurality of average residual data values for a plurality of respective time windows, wherein the plurality of respective time windows correspond to different respective subsets of the residual data values,
    wherein the value of the error parameter is determined based on the plurality of average residual data values.

18. The non-transitory computer-readable medium of claim 17, wherein the instructions further cause the at least one processing circuit to determine the value of the error parameter based on a maximum of the plurality of average residual data values.

19. The non-transitory computer-readable medium of claim 18, wherein the plurality of respective time windows represent overlapping time periods with respective start times spaced apart by a defined sliding time increment.

20. A method performed by a computing system, the method comprising:
    dividing sensor data stored on a non-transitory computer-readable medium of the computing system into training data and test data, wherein the sensor data which the non-transitory computer-readable medium is configured to store includes: (i) a set of movement data indicative of an amount or rate of relative movement between a pair of immediately adjacent arm segments of a robot arm that is occurring or has occurred via a joint of the robot arm, and (ii) a set of actuation data indicative of overall torque or overall force at the joint in a time period during which the relative movement is occurring or has occurred,
    wherein the sensor data is divided into the training data and the test data by: (i) selecting, as the training data, movement training data and corresponding actuation training data, wherein the movement training data is a first subset of the set of movement data, and wherein the actuation training data is a first subset of the set of actuation data, and (ii) selecting, as the test data, movement test data and corresponding actuation test data, wherein the movement test data is a second subset of the set of movement data, and wherein the actuation test data is a second subset of the set of actuation data,
    wherein the method further comprises:
determining, based on the movement training data and the actuation training data, at least one of: (i) a friction parameter estimate associated with friction between the pair of immediately adjacent arm segments, or (ii) a center of mass (CoM) estimate associated with one of the pair of immediately adjacent arm segments;
determining actuation prediction data based on the movement test data and based on the at least one of: (i) the friction parameter estimate or (ii) the CoM estimate, wherein the actuation prediction data is a prediction which is indicative of the overall torque or overall force at the joint at different points in time;
determining residual data, which includes residual data values describing deviation between the actuation prediction data and the actuation test data corresponding to the different points in time, respectively;
determining, based on the residual data, a value for an error parameter which describes the residual data values;
determining whether the value of the error parameter exceeds a defined error threshold; and
outputting an indication of whether the value of the error parameter exceeds the defined error threshold.

* * * * *